US007155326B2

(12) United States Patent
Nagata

(10) Patent No.: US 7,155,326 B2
(45) Date of Patent: Dec. 26, 2006

(54) ELECTRIC CONTROL UNIT

(75) Inventor: Yoshihiro Nagata, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/412,115

(22) Filed: Apr. 27, 2006

(65) Prior Publication Data

US 2006/0247835 A1 Nov. 2, 2006

(30) Foreign Application Priority Data

Apr. 27, 2005 (JP) ............................ 2005-130416

(51) Int. Cl.
*G06F 7/00* (2006.01)

(52) U.S. Cl. .......................... 701/36; 701/99; 701/102

(58) Field of Classification Search .................... 701/1, 701/36, 29, 101, 102, 103, 112, 114; 123/497, 123/519, 520

See application file for complete search history.

(56) References Cited

U.S. PATENT DOCUMENTS

| | | | | |
|---|---|---|---|---|
| 6,302,144 | B1 * | 10/2001 | Graham et al. | 137/565.17 |
| 6,354,280 | B1 * | 3/2002 | Itakura et al. | 123/519 |
| 6,606,502 | B1 * | 8/2003 | Chung Kam Chung et al. | 455/466 |
| 6,722,347 | B1 * | 4/2004 | Sanchez et al. | 123/520 |
| 6,877,488 | B1 * | 4/2005 | Washeleski et al. | 123/497 |
| 2003/0093189 | A1 | 5/2003 | Honda | |
| 2005/0021304 | A1 | 1/2005 | Hirashima | |
| 2005/0052081 | A1 | 3/2005 | Sayama | |
| 2005/0187681 | A1 | 8/2005 | Suzuki et al. | |

FOREIGN PATENT DOCUMENTS

| | | |
|---|---|---|
| JP | 2003-139874 | 5/2003 |
| JP | 2003-315474 | 11/2003 |
| JP | 2005-023843 | 1/2005 |
| JP | 2005-083221 | 3/2005 |
| JP | 2005-226488 | 8/2005 |
| JP | 2005-226494 | 8/2005 |
| JP | 2005-301615 | 10/2005 |

* cited by examiner

*Primary Examiner*—Richard M. Camby
(74) *Attorney, Agent, or Firm*—Nixon & Vanderhye P.C.

(57) ABSTRACT

In a electronic control unit, a computer is operable based on a first power supply voltage output from a power supply circuit. The computer executes a fault diagnostic task. As the fault diagnostic task, the computer controls a timer circuit to change the level of a second activate signal between an inactive level and an active level during an active level of a first activate signal. The computer monitors a level of a monitor signal output from the timer circuit to determine whether the level of the second activate signal is turned depending on the change of the second activate signal by the timer circuit based on the monitored level of the monitor signal.

18 Claims, 14 Drawing Sheets

ELECTRIC CONTROL UNIT

CROSS REFERENCE TO RELATED APPLICATIONS

This application is based on Japanese Patent Application 2005-130416 filed on Apr. 27, 2005. This application claims the benefit of priority from the Japanese Patent Application, so that the descriptions of which are all incorporated herein by reference.

FIELD OF THE INVENTION

The present invention relates to electronic control units having a microcomputer. More particularly, the present invention relates to techniques for detecting a failure or malfunction of a timer; this timer is designed to measure a period during power supply interruption to a microcomputer and to restart the microcomputer when the measured period reaches a predetermined setting value.

BACKGROUND OF THE INVENTION

Conventional electronic control units for vehicle's engine control are provided with a main power-supply circuit designed to output a constant power supply voltage Vm based on battery power when an ignition switch is turned on. The electronic control units also provided with a sub power-supply circuit designed to continuously output a constant power supply voltage Vs.

The power-supply voltage Vm output from the main power-supply circuit is supplied to electrical devices, such as a microcomputer and the like. The power supply voltage Vs output from the sub power-supply circuit is supplied to circuits and memories, such as, backup RAMs (Random Access Memories); these circuits and memories are required to continuously operate with remarkably low power consumption as compared with the microcomputer.

As an example of electronic control units having such a structure set forth above, an electronic control unit, referred to simply as "ECU", is provided with a timer operating based on the power supply voltage output from the sub power-supply circuit. The timer, normally so called soak timer, is configured to measure a standby (suspend) period of the microcomputer, in other words, a period during power supply interruption from the main power-supply circuit to the microcomputer. The timer is configured to cause the main power-supply circuit to output the power supply voltage Vm to the microcomputer to activate it when the measured period reaches a predetermined setting period. The electronic control unit with the timer set forth above is typically disclosed in U.S. Patent Application No. 2003/0093189A1 corresponding to Japanese Unexamined Patent Publication No. 2003-139874.

Install of such a timer (soak timer) into the ECU allows the microcomputer to perform desired tasks when the predetermined setting period has elapsed after turning-off of the ignition switch without continuous supply of the power supply voltage to the microcomputer. This makes it possible to reduce the ECU's power consumption.

Specifically, the ECU, typically disclosed in the U.S. patent application, includes (a) the main power-supply circuit and (b) the timer.

The main power-supply circuit is configured to output the power supply voltage Vm when any one of a switch signal in response to turning on or off of the ignition switch and an activate signal created inside the ECU has an active level.

The timer is integrated with a counter whose count value is resettable by the microcomputer. The counter is operative to count (count up) from its initial value when the ignition switch is turned off so that the power supply voltage Vm is interrupted from the main power supply-circuit to the microcomputer. The timer is configured to turn the activate signal from an inactive level to an active level to allow the main power-supply circuit to output the power supply voltage Vm to the microcomputer, thereby activating it.

Note that the described ECU with the timer allows diagnosis of an evaporative emission control system whose structure is typically disclosed in the U.S. patent application.

Specifically, in check of an evaporative emission control system of this type, while a system for collecting fuel evaporative emissions escaping from the fuel tank is closed, pressurization or reduction in the system to create variation in pressure in the evaporative emission control system allows air-tightness in the system to be checked. Immediately after the engine has been operated for a long period under high-load conditions, it is difficult to obtain an accurate result of the check because the fuel in the fuel tank easily evaporates.

Accordingly, after a constant period has elapsed from stop of the engine, such as turning-off of the ignition switch, the timer causes the microcomputer to boot up so that microcomputer checks air-tightness in the evaporative emission control system set forth above.

In such an ECU used to check air-tightness in the evaporative emission control system, a failure or malfunction of the timer may make it difficult for the microcomputer to perform predetermined tasks within off state of the ignition switch; these predetermined tasks include air-tightness checking operations set forth above.

In order to solve the difficulty in performing the predetermined tasks, when booting up in response to turning on of the ignition switch, the microcomputer of the ECU disclosed in the U.S. patent application reads out a count value of the counter of the timer and determines whether the timer properly operates based on the readout count value.

The techniques disclosed in the U.S. patent application are to detect an abnormality representing that the timer cannot activate the microcomputer, in other words, the predetermined tasks cannot be performed, within off state of the ignition switch after turning on of the ignition switch. The techniques are therefore not to detect such an abnormality within off state of the ignition switch.

In a case where a failure representing that the timer keeps the activate level of the activate signal being sent to the main power-supply circuit, even if the ignition switch is turned off, the power supply voltage remains fed to the microcomputer from the main power-supply circuit. There have been requests for detecting such a timer failure.

SUMMARY OF THE INVENTION

In view of the background, an object of at least one aspect of the present invention is to preliminarily detect, within an active level of a switch signal for activating a microcomputer, a failure that will occur within an inactive level of the switch signal.

According to one aspect of the present invention, there is provided an electronic control unit. The electronic control unit includes a power supply circuit configured to receive an externally input first activate signal and a second activate signal and configured to output a first power supply voltage when it is determined that at least one of the first and second activate signals is in an active level. The power supply circuit is configured to interrupt the output of the first power supply voltage when it is determined that both the first and second activate signals are inactive levels, respectively. The electronic control unit also includes a timer circuit. The timer circuit is configured to measure a period that has elapsed since the interruption of the output of the power supply voltage, and turn the second activate signal from the inactive level to the active level when the measured period reaches a predetermined first setting period. The level of the second activate signal is changeable between the inactive level and the active level based on external control. The timer circuit is also configured to output a monitor signal associated with the second activate signal. The electronic control unit further includes a computer operable based on the first power supply voltage output from the power supply circuit. The computer being configured to execute a fault diagnostic task by:

controlling the timer circuit to change the level of the second activate signal between the inactive level and the active level during the active level of the first activate signal, and monitoring a level of the monitor signal output from the timer circuit to determine whether the level of the second activate signal is turned depending on the change of the second activate signal by the timer circuit based on the monitored level of the monitor signal.

According to another aspect of the present invention, there is provided an electronic control unit. The electronic control unit includes a power supply circuit configured to receive an externally input first activate signal and a second activate signal and configured to output a first power supply voltage when it is determined that at least one of the first and second activate signals is in an active level. The power supply circuit is configured to interrupt the output of the first power supply voltage when it is determined that both the first and second activate signals are inactive levels, respectively. The electronic control unit also includes an IC circuit including a timer module and a control module. The timer module is configured to measure a period that has elapsed since the interruption of the output of the power supply voltage, and turn the second activate signal from the inactive level to the active level when the measured period reaches a predetermined first setting period. The level of the second activate signal is changeable between the inactive level and the active level based on external control. The timer module is also configured to output a monitor signal associated with the second activate signal. The control module is operable based on the first power supply voltage output from the power supply circuit. The control module is configured to execute a fault diagnostic task by:

controlling the timer circuit to change the level of the second activate signal between the inactive level and the active level during the active level of the first activate signal, and monitoring a level of the monitor signal output from the timer module to determine whether the level of the second activate signal is turned depending on the change of the second activate signal by the timer module based on the monitored level of the monitor signal.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
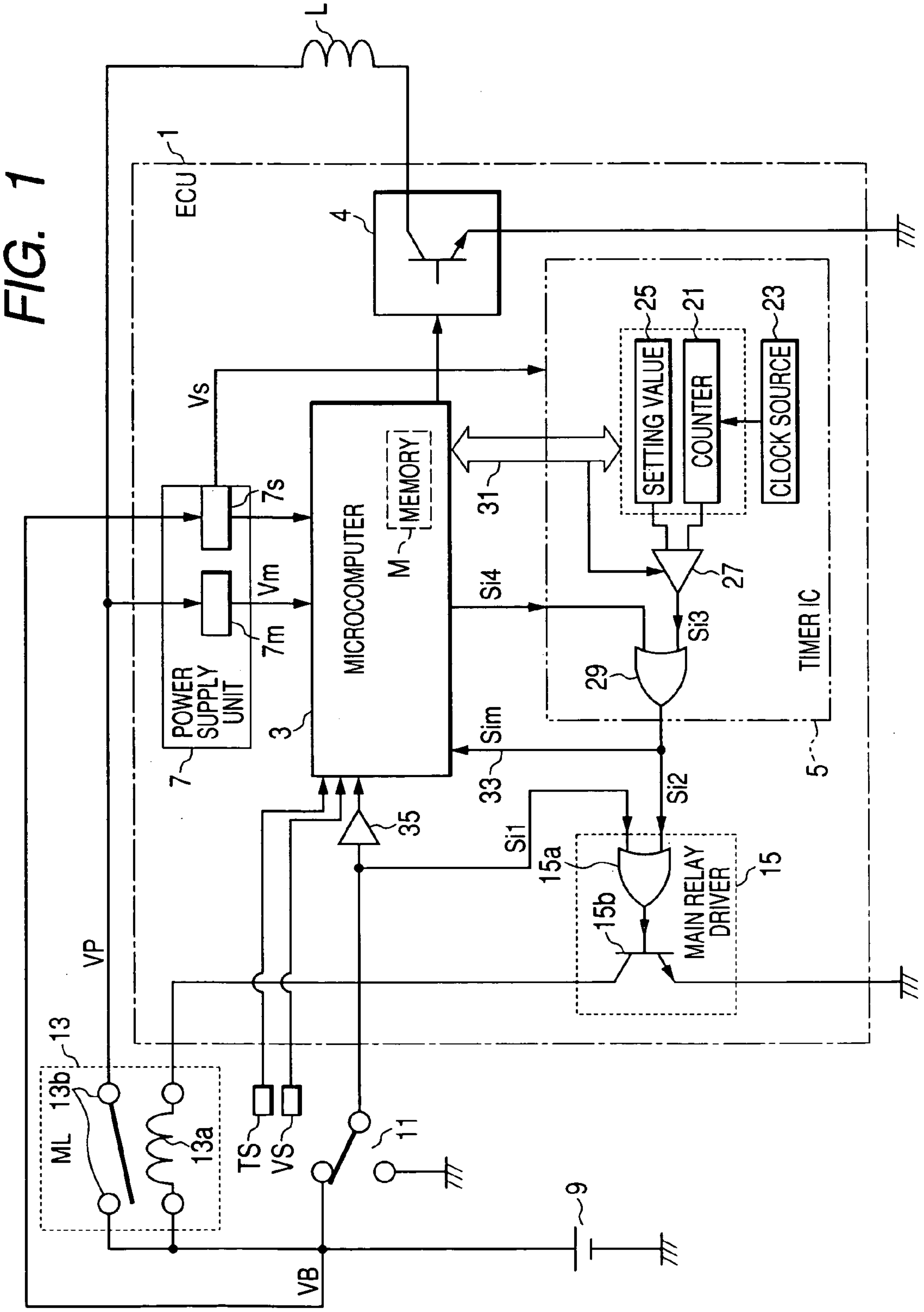
FIG. 1 is a circuit diagram schematically illustrating an example of the configuration of an electronic control unit according to a first embodiment of the present invention.

Referring to the drawings, in which like reference characters refer to like parts in several views, particularly to FIG. 1, there is illustrated an electronic control unit 1 according to a first embodiment of the present invention. The electronic control unit, referred to simply as "ECU" hereinafter, 1 has been installed in, for example, a vehicle. The ECU 1 is operative to control engine actuators (e.g. ignition coils, fuel injectors, various valves, and so on) as examples of control targets; these engine and actuators have been installed in the vehicle.

Specifically, the ECU 1 includes a microcomputer 3, a load drive circuit 4, a timer IC (Integrated Circuit) 5, and a power supply unit 7.

The microcomputer 3 is programmed to execute various tasks for controlling the control targets, such as the engine actuators. The load drive circuit 4 is electrically connected to the microcomputer 3 and configured to drive at least one electrical load L based on control signals sent from the microcomputer 3; this at least one electrical load L is associated with the engine actuator control.

The timer IC 5 is electrically connected to the microcomputer 3. The timer IC 5 serves as a soak timer unit. Specifically, the timer IC 5 is configured to measure a standby (suspend) period of the microcomputer and to independently activate the microcomputer 3 based on the measured standby period.

The power supply unit 7 is composed of a main power-supply circuit 7*m* and a sub power-supply circuit 7*s*. The main power-supply circuit 7*m* is electrically connected to the microcomputer 3 and designed to output a main power supply voltage Vm to be used to make the microcomputer 3 operate. The sub power-supply circuit 7*s* is electrically connected to the timer IC 5 and designed to output a sub power supply voltage Vs used to make the timer IC 5 operate.

A positive terminal of a battery 9 installed in the vehicle at the exterior of the ECU 1 is electrically connected to the sub power-supply circuit 7*s* so that a constant voltage, that is, battery voltage, VB at the positive terminal of the battery 9 is continuously applied thereto. The sub power-supply circuit 7*s* is operative to continuously generate the sub power supply voltage Vs based on the applied battery voltage VB, thereby continuously outputting the created sub power supply voltage Vs to the timer IC 5.

An ignition switch 11 of the vehicle disposed at the exterior of the ECU 1 is electrically connected to the main power-supply circuit 7*m*. Moreover, a main relay (ML) 13 of the vehicle disposed at the exterior of the ECU 1 is also electrically connected between the positive terminal of the battery 9 and each of the main power-supply circuit 7*m* and the electrical load L. The main relay 13 is also electrically connected to the timer IC 5.

The main power-supply circuit 7*m* is configured such that the battery voltage VB is supplied thereto through the main relay 13 when the ignition switch 11 is in on state or when an activate signal Si2 to be output from the timer IC 5 is in a high level. Note that the battery voltage to be supplied from the positive terminal of the battery 9 through the main relay 13 will be refereed to as "battery voltage VP" in distinction from the battery voltage VB. The main power-supply circuit 7*m* is also configured to generate the main power supply voltage Vm based on the supplied battery voltage VP, thereby outputting the generated main power supply voltage Vm to the microcomputer 3.

More specifically, to the ECU 1, an ignition switch signal Si1 corresponding to an activate switch signal is input through the ignition switch 11. The ignition switch (ISGW) signal, Si1 has, for example, positive logic (high active) representing the timing when the ignition switch 11 is turned on, by, for example, the location of an ignition key of the vehicle being inserted in a key cylinder thereof to the ignition position from the off position by the vehicle's driver. Specifically, the IGSW signal Si1 is turned from a low level to a high level when the ignition switch 11 is turned on, whereas turned from the high level to the low level when the ignition switch 11 is turned off.

In addition, the ECU 1 includes a main relay driver 15 composed of an AND gate 15*a* and an NPN transistor 15*b* whose base is connected to the output terminal of the AND gate 15*a*. Two input terminals of the AND gate 15*a* are connected to the ignition switch 11 and the timer IC 5. The main relay driver 15 is configured to energize a coil 13*a* of the main relay 13 to short relay contacts 13*b* of the relay, in other words, to turn the relay 13 on when at least one of the IGSW signal Si1 and the activate signal Si2 sent from the timer IC 5 is in the high level. Note that the main relay driver 15 is designed to operate based on the sub power supply voltage Vs like the timer IC 5.

When at least one of the IGSW signal Si1 and the activate signal Si2 is in the high level, the main relay 13 is turned on so that the battery voltage VP is supplied to the main power-supply circuit 7*m*. Based on the supplied battery voltage VP, the main power supply voltage Vm is supplied to the microcomputer 3 from the main power-supply circuit 7*m*. Note that the battery voltage VP is also supplied to the electrical load L.

The power supply unit 7 has a power on reset function. Specifically, as the power on reset function, the power supply unit 7 is configured to continuously output, to the microcomputer 3, a reset signal until a short period has elapsed from the start of the main power supply voltage output by the main power-supply circuit 7*m*. The elapse of the short period from the start of the main power supply output to the microcomputer 3 is required to shift the main power supply voltage Vm from its unstable state to its stable state. The start of the main power supply voltage Vm from the main power-supply circuit 7*m* allows the microcomputer 3 to start to operate from its initial state, in other words, to be activated.

The timer IC 5 is composed of a counter 21 for measurement of time, and a clock source 23 electrically or operatively connected to the counter 21 and serving as clock source therefor. Specifically, the counter 21 is, for example, operative to count up from its initial value in synchronization with a clock signal output from the clock source 23.

The timer IC 5 is also composed of a register 25 configured to has stored therein a setting value to be used for comparison with the count value of the counter 21. The timer IC 5 is also composed of a comparator 27 electrically or operatively connected to both the register 25 and the counter 21. The comparator 27 is configured to compare the count value with the setting value stored in the register 25 and to hold the level of its output signal Si3 indicative of the compared result to a high level. The output signal Si3 will be referred to as "comparison result signal" hereinafter.

The timer IC 5 is further composed of an OR gate 29 electrically or operatively connected to the comparator 27 and the microcomputer 3. The OR gate 29 is configured to OR the comparison result signal Si3 and a power hold signal Si4 output from the microcomputer 3 and to externally output the ORed signal to the main relay driver 15 as the activate signal Si2.

Moreover, the timer IC 5 has the following first to fourth functions of:

receiving a "timer-start command" sent from the microcomputer 3 through a communication line 31 so that the timer-start command allows the count value of the counter to be reset to its initial value of, for example, zero; this communication line 31 is electrically or operatively connected between the microcomputer 3 and the timer IC 5 (the first function);

permitting the microcomputer 3 to write an arbitrary value into the register 25 as the setting value (the second function);

allowing the comparator 27 to reset the output level of the comparison result signal Si3 from the high level to a low level when the comparator 27 receives an "output reset command" sent from the microcomputer 3 through the communication line 31 (the third function); and enabling the microcomputer 3 to read out the count value of the counter 21 through the communication line 31.

The elements of the timer IC 5 can be designed to functional modules of a microcomputer, or dedicated hardware devices.

The ECU 1 is equipped with a monitor signal line 33 electrically or operatively connected between the output of the OR gate 29 and the microcomputer 3. The monitor signal line 33 allows the microcomputer 3 to monitor the activate signal Si2 output from the timer IC 5. Specifically, the microcomputer 3 is configured to receive a monitor signal Sim equivalent to the activate signal Si2 and input from the timer IC 5 through the monitor signal line 33 and to monitor the level of the activate signal Si2 being output from the timer IC 5 to the main relay driver 15. In addition, to the microcomputer 3, the IGSW signal Si1 is configured to be input through a buffer 35.

In addition, in the vehicle, various sensors for sensing the operating conditions of the engine have been installed in the vehicle, which are not shown in the figures.

For example, the sensors include a water temperature sensor TS configured to sense the temperature of a coolant used in a cooling system installed in the vehicle and to output a signal indicative of the sensed temperature to the microcomputer 3; this cooling system is configured to remove heat from the engine.

The sensors also include a vehicle speed sensor VS configured to sense the vehicle speed and to output a signal indicative of the sensed vehicle speed to the microcomputer 3.

In the first embodiment, the signals Si1 to Si4, and Sim set forth above have high active. Note that a signal with high active means a signal whose active level is a high level (high voltage level), and whose inactive level is a low level (low voltage level) lower than the high level.

Next, operations of the microcomputer 3 will be described hereinafter.

Figure 2:
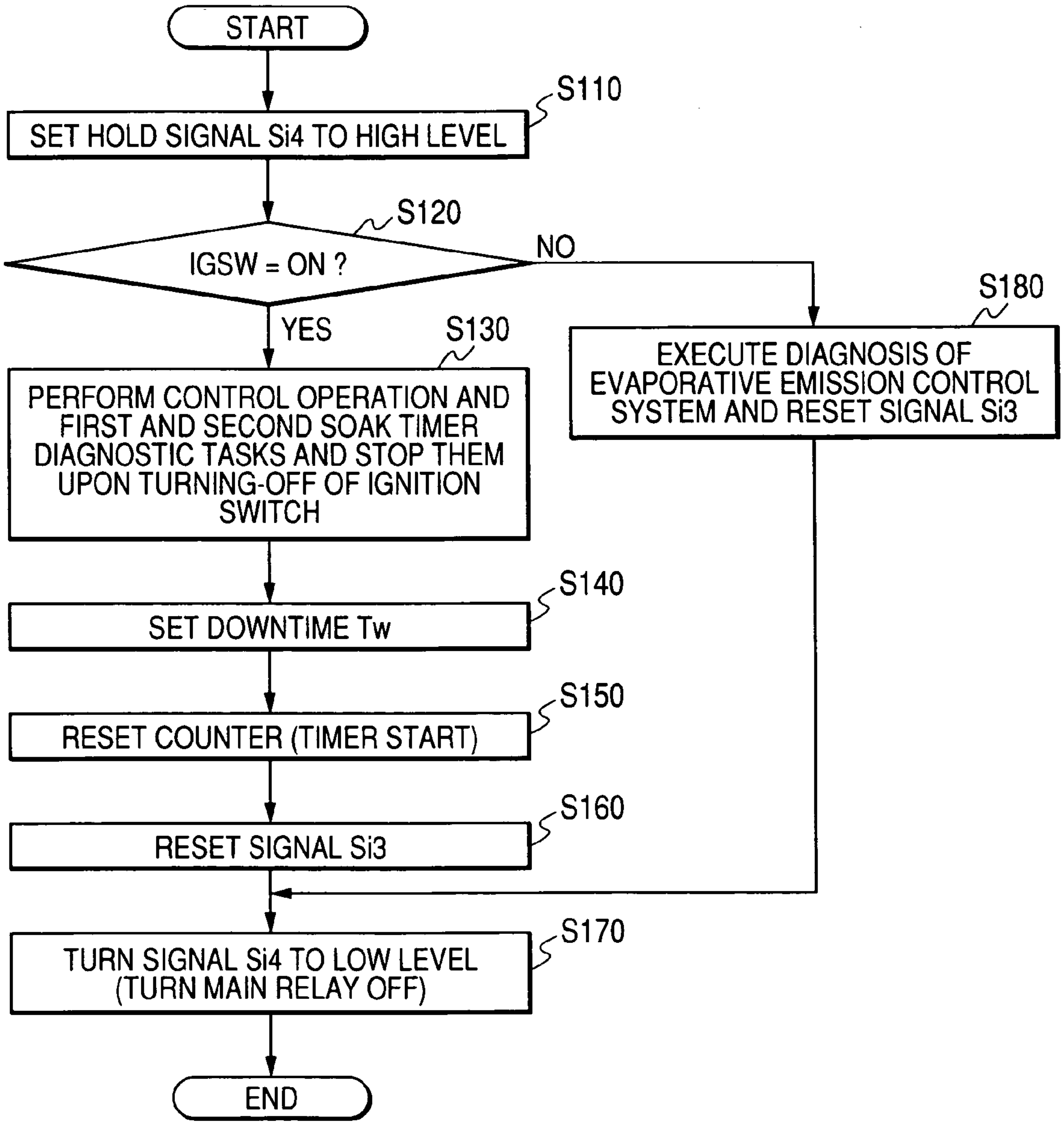
FIG. 2 is a flowchart schematically illustrating normal operations of the electronic control unit illustrated in FIG. 1.

As illustrated in FIG. 2, when being activated based on the main power supply voltage Vm supplied from the main power-supply circuit 7*m*, the microcomputer 3 executes normal operations illustrated in FIG. 2 in accordance with at least one program installed in the memory unit. In other words, the at least one program causes the microcomputer 3 to execute the normal operations illustrated in FIG. 2.

Specifically, the microcomputer 3 turns the power hold signal Si4 from the low level to the high level in step S110 of FIG. 2. This allows the activate signal Si2 to the main relay driver 15 from the timer IC 5 to be held to the high level independently of the level of the comparison result signal Si3. The high level of the activate signal Si2 maintains the continuous supply of the battery voltage VP from the main relay 13 to the ECU 1 independently of turning on and off of the IGSW switch signal. In other words, the high level of the activate signal Si2 allows the microcomputer 3 and the ECU 1 to operate. Note that activation of the microcomputer 3 is equivalent to that of the ECU 1, so that the battery voltage VP supplied from the battery 9 through the main relay 13 serves as a power supply voltage required for the ECU 1 to work.

In the next step S120, in order to determine whether the microcomputer activation depends on when the ignition switch 11 is turned on or when the activate signal Si2 is turned to the high level, the microcomputer 3 reads the level of the IGSW signal input thereto from the buffer circuit 35. In addition, in step S120, the microcomputer 3 determines whether the ignition switch 11 is in on state based on the readout level.

If it is determined that the ignition switch 11 is in on state (the determination in step S120 is YES), the microcomputer 3 determines that the microcomputer activation depends on when the ignition switch 11 is turned on, going to step S130.

In step S130, the microcomputer 3 performs control tasks for the engine actuators, such as fuel injection control task and ignition control task. During control task execution in step S130, the microcomputer 3 parallely performs first and second soak-timer diagnostic tasks at one or more times; these first and second soak timer diagnostic tasks will be illustrated respectively in FIGS. 7 and 8.

The first and second soak-timer diagnostic tasks are processes required to diagnose whether the timer IC 5 normally operates. The microcomputer 3 determines whether the ignition switch 11 is turned off during control task execution in step S130. If it is determined that the ignition switch 11 is turned off, the microcomputer 3 executes tasks required to stop the engine actuators, shifting to step S140.

In step S140, the microcomputer 3 stores a setting value in the register 25 of the timer IC 5, this setting value corresponds to a downtime Tw before the next activation of the microcomputer 3. Subsequently, the microcomputer 3 sends the "timer-start command" to the timer IC 5, which causes the counter 21 to start to count up from its initial value (zero).

In the next step S160, for added safely, the microcomputer 3 sends the "output reset command" to the timer IC 5, which causes the comparison result signal Si3 to be reset to the low level, and in the next step S170, the "output reset command" causes the power hold signal Si4 to revert to the low level. Thereafter, the microcomputer 3 shifts into no operation mode (suspend mode) in which the microcomputer 3 executes substantially no operations.

The low level of the power hold signal Si4 allows the activate signal Si2 from the timer IC 5 to the main relay driver 15 to be turned to the low level. Because the IGSW signal Si1 has the low level when the activate signal Si2 is turned to the low level, the main relay 13 is turned off so that the power supply from the main power-supply circuit 7*m* to the microcomputer 3 is interrupted, whereby the operations of the microcomputer 3 and the ECU 1 are suspended.

In step S120, if it is determined that the ignition switch 11 is in off state (the determination in step S120 is NO), the microcomputer 3 determines that the microcomputer activation depends oil when the activate signal Si2 is turned to the high level in response to the turning on of the comparison result signal Si3 to the high level. Thus, the microcomputer 3 shifts to step S180.

In step S180, the microcomputer 3 sends the "output-reset command" to the timer IC 5, which causes the comparison result signal Si3 to be reset to the low level. In step S180, the microcomputer 3 also executes the evaporation diagnostic tasks (air-tightness checking processes in an evaporative emission control system) set forth above.

Specifically, the microcomputer 3 causes an actuator to close a system for collecting fuel evaporative emissions escaping from the fuel tank to pressurize or depressurize the system. The microcomputer 3 detects a change in pressure inside the system, which is sensed by a sensor, thereby checking air-tightness in the system based on the detected pressure change inside the system. The checked result of the evaporation diagnosis can be stored in a nonvolatile memory (rewritable memory) included in a memory unit M; this memory unit M has been installed in the microcomputer 3, or in the exterior thereof. In the first embodiment, the memory unit M has been installed in the microcomputer 3.

The checked result stored in the nonvolatile memory can be read out to an exterior diagnosis device that is communicated with the ECU 1 through a communication like. If the checked result represents that there is a failure, the checked result can be displayed on a display device installed in the vehicle.

After the operation in step S180, the microcomputer shifts to step S170 set forth above, and turns the power hold signal Si4 from the high level to the low level, and thereafter, the microcomputer 3 shifts into the no operation mode. This allows the operations of the microcomputer 3 and the ECU 1 to be suspended as set forth above.

Figure 3:
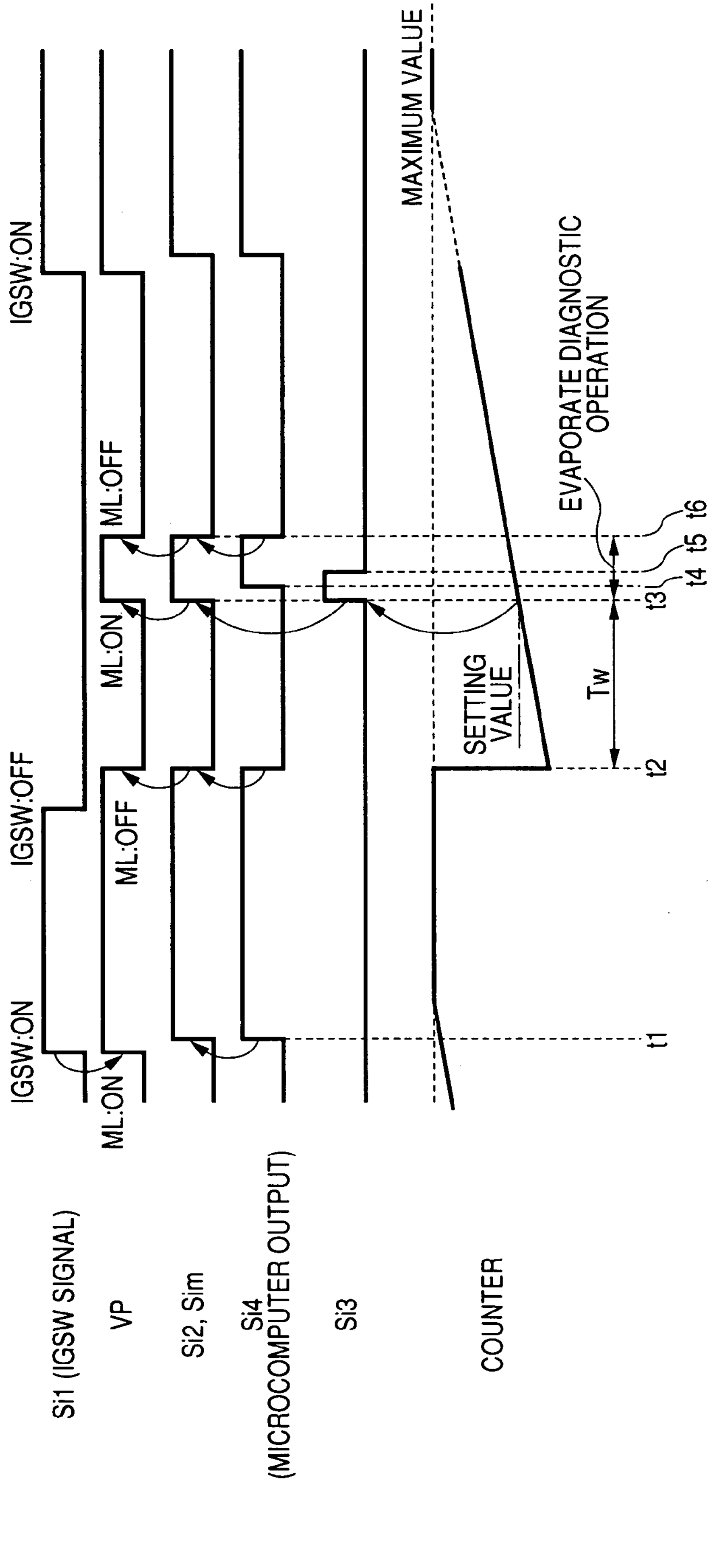
FIG. 3 is a timing chart schematically illustrating timings of the normal operations of the electronic control unit illustrated in FIG. 1.
Figure 4:
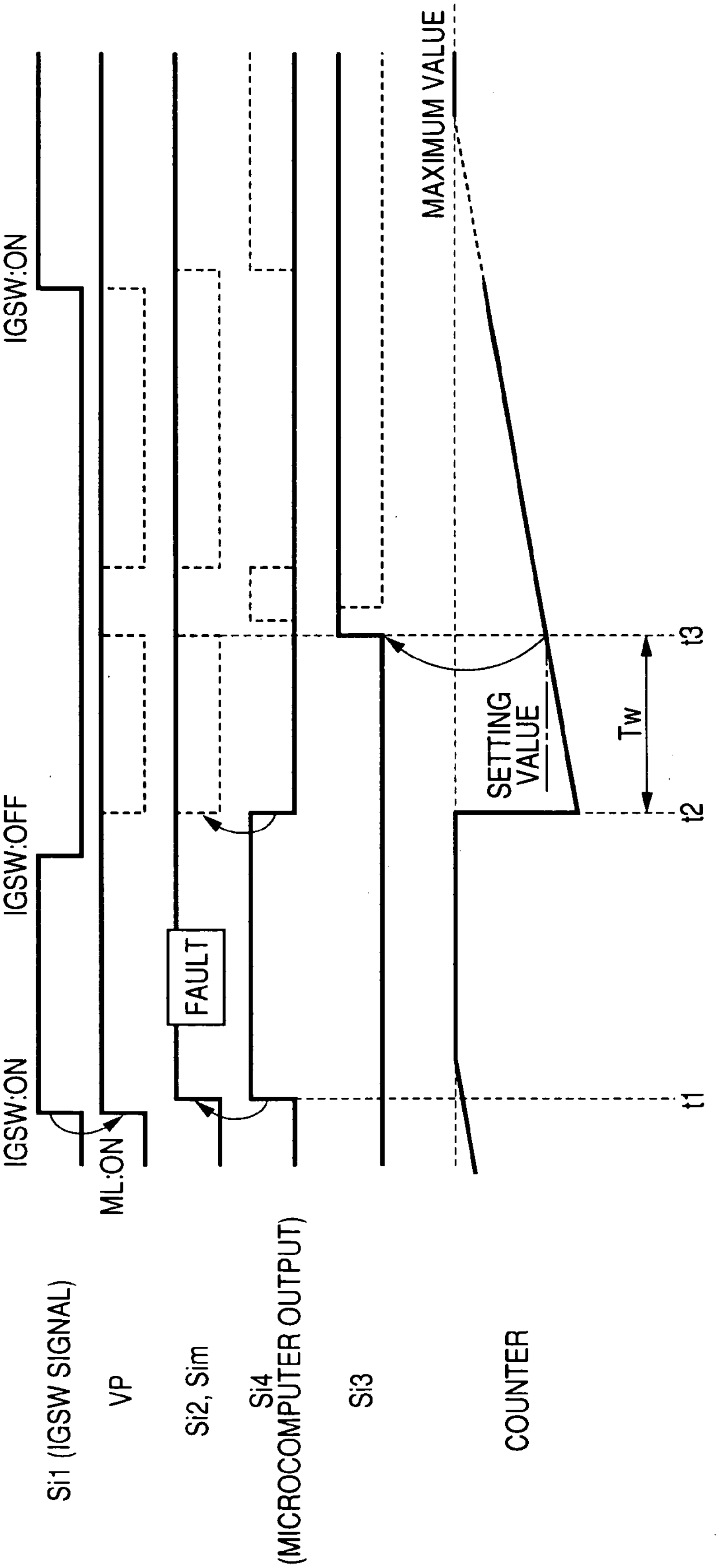
FIG. 4 is a timing chart schematically illustrating timings of the normal operations of the electronic control unit when a failure occurs therein.
Figure 5:
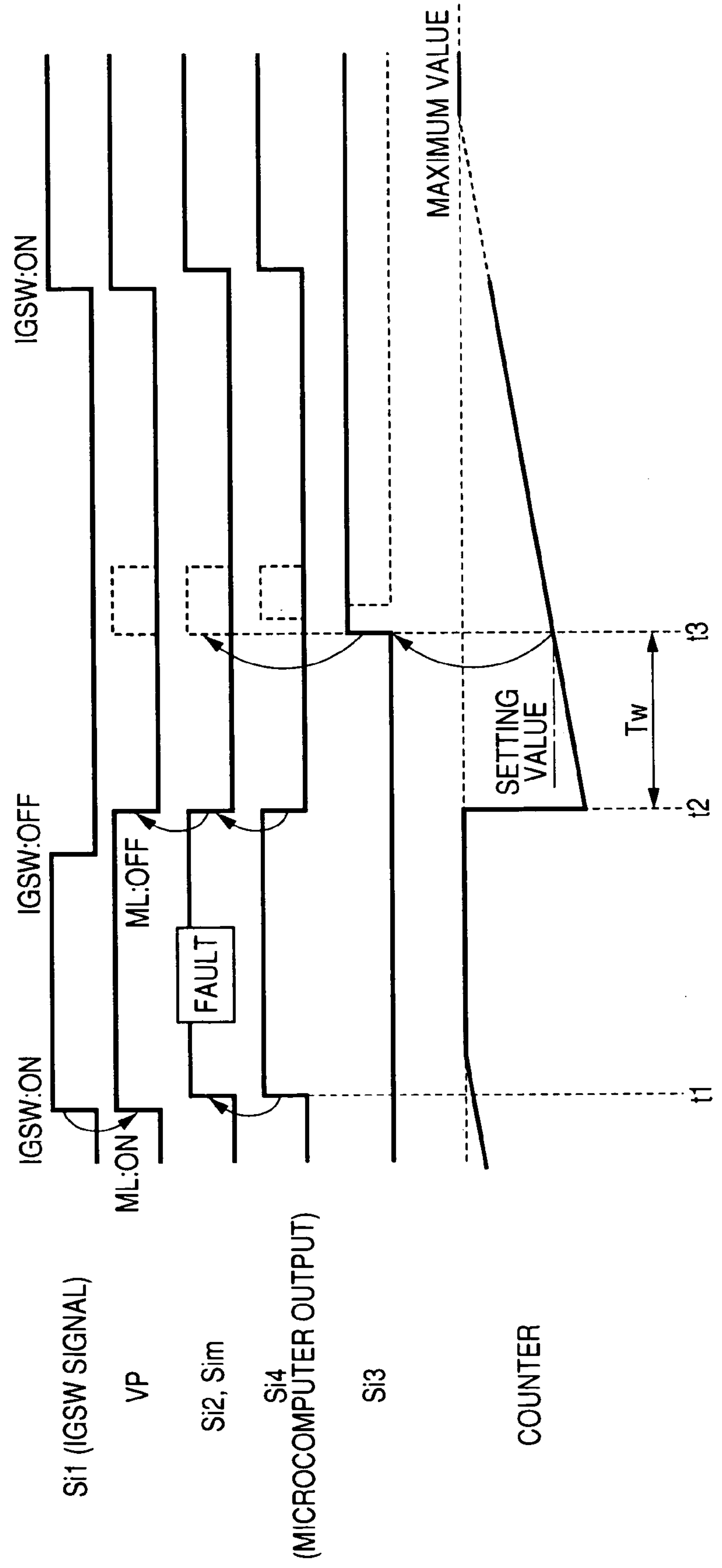
FIG. 5 is a timing chart schematically illustrating timings of the normal operations of the electronic control unit when a failure occurs therein.
Figure 6:
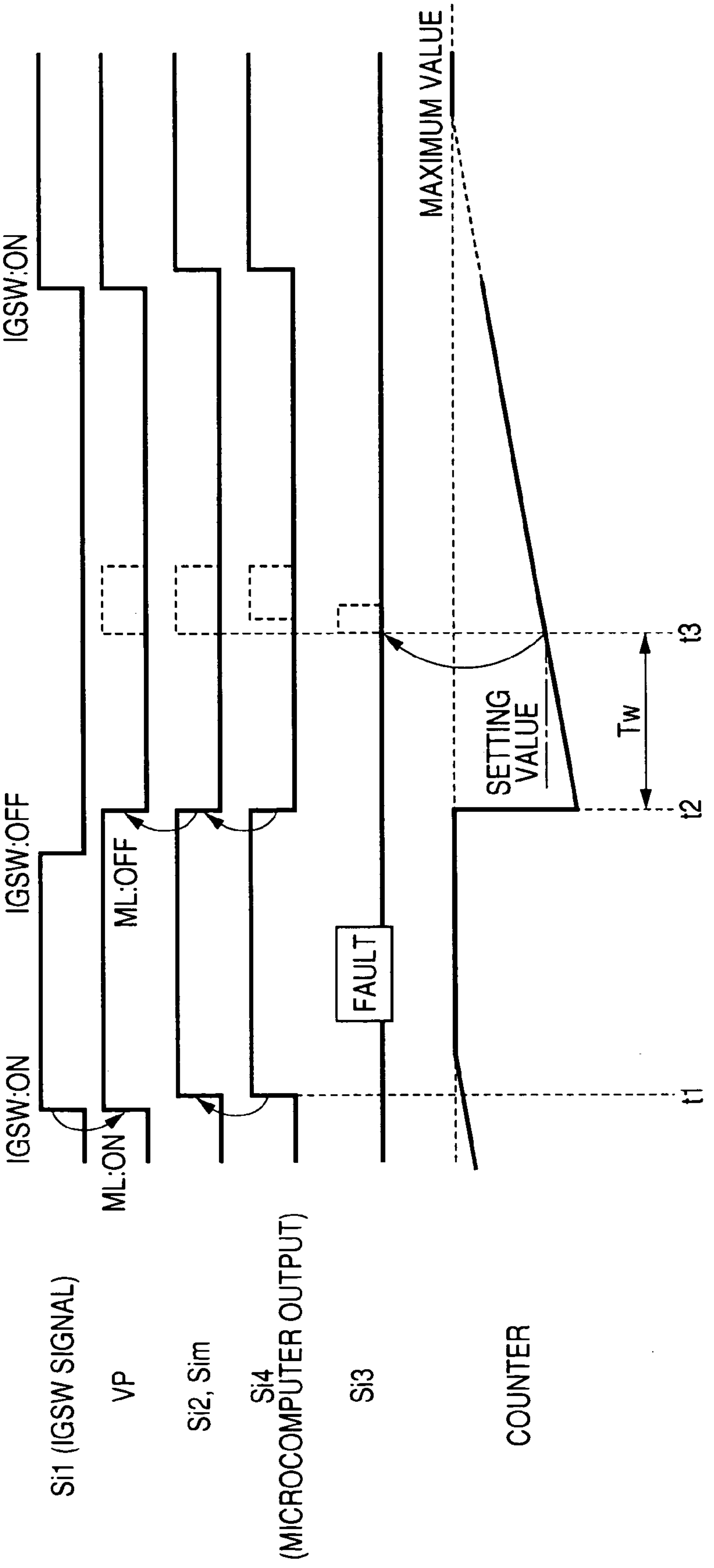
FIG. 6 is a timing chart schematically illustrating timings of the normal operations of the electronic control unit when a failure occurs therein.

Next operations of the ECU 1 without performing the first and second soak-timer diagnostic tasks will be described hereinafter using timing charts illustrated in FIGS. 3 to 6. Note that FIG. 3 illustrates the normal operations of the ECU 1, and FIGS. 4 to 6 illustrate the normal operations of the ECU 1 when a failure occurs therein.

First, the normal operations of the ECU 1 will be described hereinafter with reference to FIG. 3.

When the ignition switch 11 is turned on so that the IGSW signal Si1 is turned from the low level to the high level, the main relay 13 is turned on. This allows the battery voltage VP to be supplied to the ECU 1 so that the main power supply voltage Vm is output from the main power-supply circuit 7*m*, which activates the microcomputer 3.

The activation of the microcomputer 3 allows the power hold signal Si4 to be turned from the low level to the high level (see step S110), so that the activate signal Si2 is turned from the low level to the high level (see the timing t1). The microcomputer 3 performs is the control tasks for the engine actuators (see step S130).

Thereafter, when the ignition switch 11 is turned off, the microcomputer 3 stores the setting value in the register 25, which is equivalent to the down time Tw before the next activation of the microcomputer 3, and causes the counter 21 to start to count up from the initial value (zero) (see steps S140 and S150 and the timing t2 in FIG. 3). At the timing t2, the microcomputer 3 causes the comparison result signal Si3 to be reset (see step S160), and causes the power hold signal Si4 to be turned from the high level to the low level (see step S170).

The low level of the power hold signal Si4 allows the activate signal Si2 from the timer IC 5 to the main relay driver 15 to be turned from the high level to the low level. This permits the main relay 13 to be turned off so that the power supply from the main power-supply circuit 7*m* to the ECU 1 is interrupted (see the timing t2).

After the downtime Tw has elapsed, the count value of the counter 21 agrees with the setting value stored in the register 25 so that the comparison result signal Si3 is turned from the low level to the high level (see the timing t3 in FIG. 3). This permits the activate signal Si2 output from the timer IC 2 to be turned from the low level to the high level (see the timing t3), causing the main relay 13 to be turned on. This allows the battery voltage VP to be supplied to the ECU 1 from the battery 9, which resumes the microcomputer 3.

The microcomputer 3 allows the power hold signal Si4 to be turned from the low level to the high level (see step S110 and the timing t4 in FIG. 3), and thereafter, the microcomputer 3 causes the comparison result signal Si3 to be reset to the low level (see step S180 and the turning t5). In addition, after resuming at the timing t3, the microcomputer 3 executes the evaporative diagnostic tasks (see step S180).

After the evaporative diagnostic tasks have been completed, the microcomputer 3 turns the power hold signal Si4 from the high level to the low level (see step S170 and the timing t6 in FIG. 3).

This allows the activate signal Si2 to be turned from the high level to the low level (see the timing t6), so that the main relay 13 is turned off, whereby the supply of the battery voltage VP to the ECU 1 is interrupted.

Thereafter, when the ignition switch 11 is turned on, the main relay 13 is turned on again, the microcomputer 3 resumes based on the main power supply voltage Vm set forth above.

These operations set forth above are the normal operations of the ECU 1. For example, when a failure in which the activate signal Si2 is not returned from the high level to the low level due to a malfunction in a wiring between the timer IC 5 and the main relay driver 15 and/or inside the timer IC 5 occurs, the activate signal Si2 would be kept to the high level even if the power hold signal Si4 is turned to the low level in response to turning off of the ignition switch 11 (see the timing t2 of FIG. 4). This would cause the main relay 15 no to be turned off so that the battery voltage VP would be continuously supplied to the ECU 1. The continuous supply of the battery voltage VP to the microcomputer 3 would cause the microcomputer 3 to remain in the no operation mode, which would wastefully burn battery power.

As another example, when a failure in which the activate signal Si2 is not returned from the low level to the high level in response to when the comparison result signal is turned to the high level occurs, the activate signal Si2 would be kept to the low level even through the downtime Tw has elapsed since the turning off of the ignition switch 11 (see the timing t3 of FIG. 5). This would cause the main relay 15 to be kept in off state so that the microcomputer 3 cannot be resumed. This would result in that the evaporative diagnostic tasks would not be carried out.

As a further example, when a failure in which the comparison result signal Si3 itself is not turned from the low level to the high level occurs in the timer IC 5, the activate signal Si2 would be kept to the low level even though the downtime Tw has elapsed since the turning off of the ignition switch 11 (see the timing t3 of FIG. 5). This would cause the main relay 15 to be kept in off state so that the microcomputer 3 cannot be activated.

Figure 7:
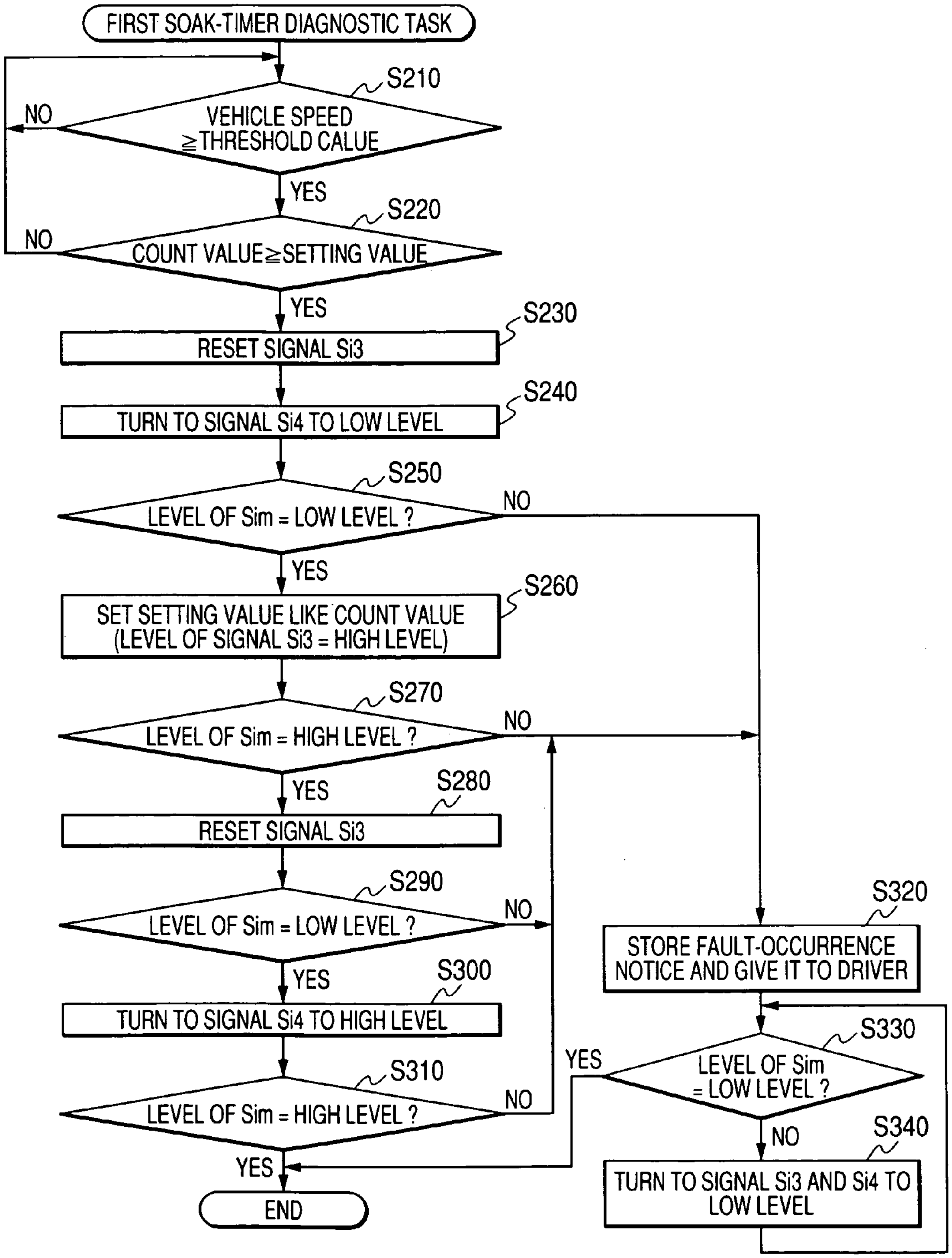
FIG. 7 is a flowchart schematically illustrating a first soak-timer diagnostic task of the electronic control unit illustrated in FIG. 1.
Figure 8:
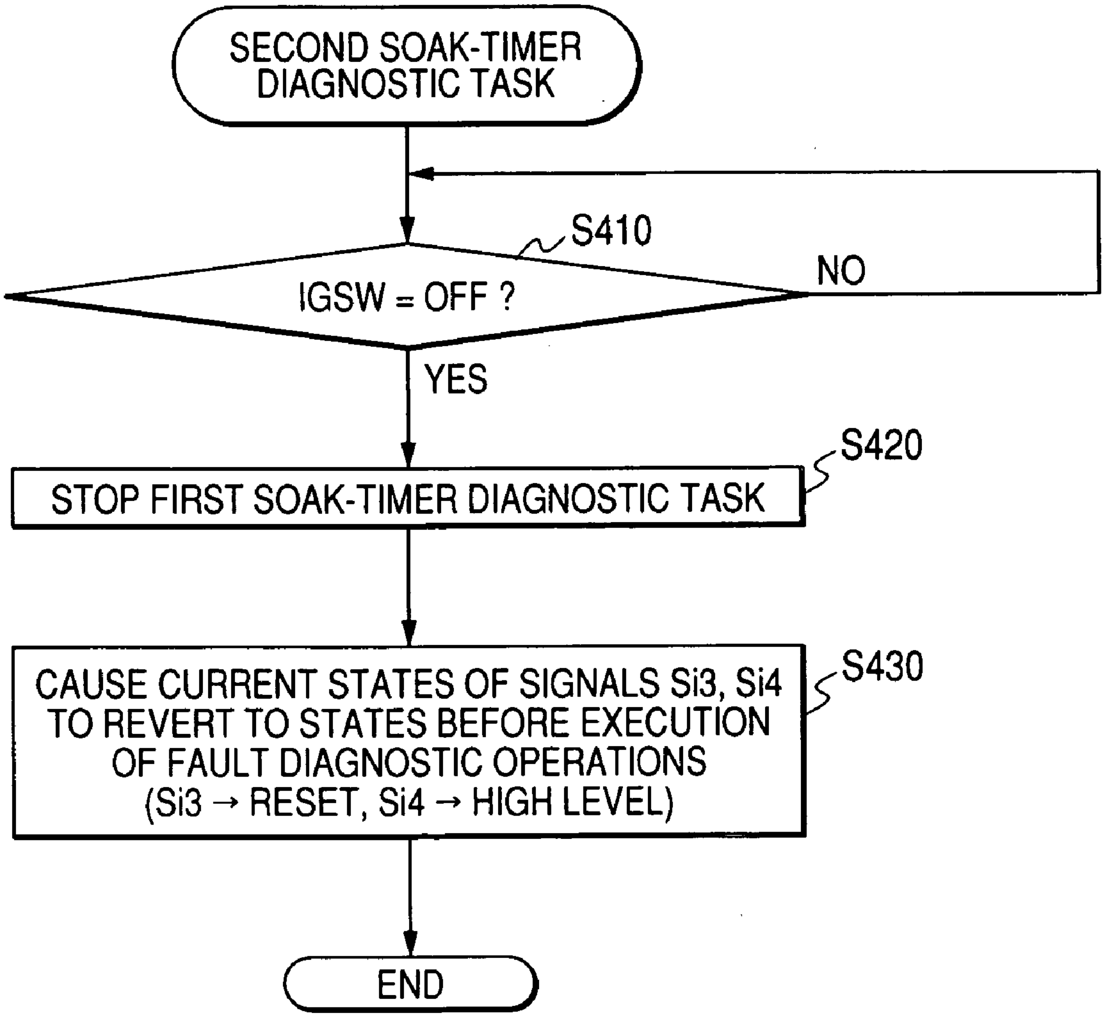
FIG. 8 is a flowchart schematically illustrating a second soak-timer diagnostic task of the electronic control unit illustrated in FIG. 1.

Thus, in the first embodiment, the microcomputer 3 is configured to parallely execute the first and second soak-timer diagnostic tasks illustrated respectively in FIGS. 7 and 8 in step S130 of FIG. 2 in accordance with at least one program installed in the memory unit M. In other words, the at least one program causes the microcomputer 3 to parallely execute the first and second soak-timer diagnostic tasks illustrated respectively in FIGS. 7 and 8.

Specifically, as illustrated in FIG. 7, when starting the first soak-timer diagnostic task, the microcomputer 3 determines whether the current vehicle speed is equal to or more than a predetermined threshold speed (value) based on the signal sent from the vehicle speed sensor VS in step S210.

If it is determined that the current vehicle speed is equal to or more than the predetermined threshold speed (the determination in step S210 is YES), the microcomputer 3 reads out the current count value from the counter 21 of the timer IC 5. Then, the microcomputer 3 determines whether the readout count value is equal to or more than the setting value stored in the register 25 of the timer IC 5 in step S220.

If it is determined that the readout count value is equal to or more than the setting value (the determination in step S220 is YES), the microcomputer 3 goes to step S230.

In step S230, to make sure, the microcomputer 3 sends the "output reset commmand" to the timer IC 5, which causes the comparison result signal Si3 to be reset to the low level. Next, in step S240, the microcomputer 3 turns the power hold signal Si4 from the high level to the low level, thereby turning the activate signal Si2 from the high level to the low level (see the timing (1) in FIG. 9).

In the next step S250, the microcomputer 3 determines whether the level of the monitor signal Sim input through the monitor signal line 33, in other words, the level on the monitor signal line 33 is turned from the high level to the low level. If it is determined that the level of the monitor signal Sim input through the monitor signal line 33 is turned from the high level to the low level (the determination in step S250 is YES), the microcomputer 3 determines that the timer IC 5 properly operates, going to step S260 (see the timing (1) in FIG. 9).

Figure 9:
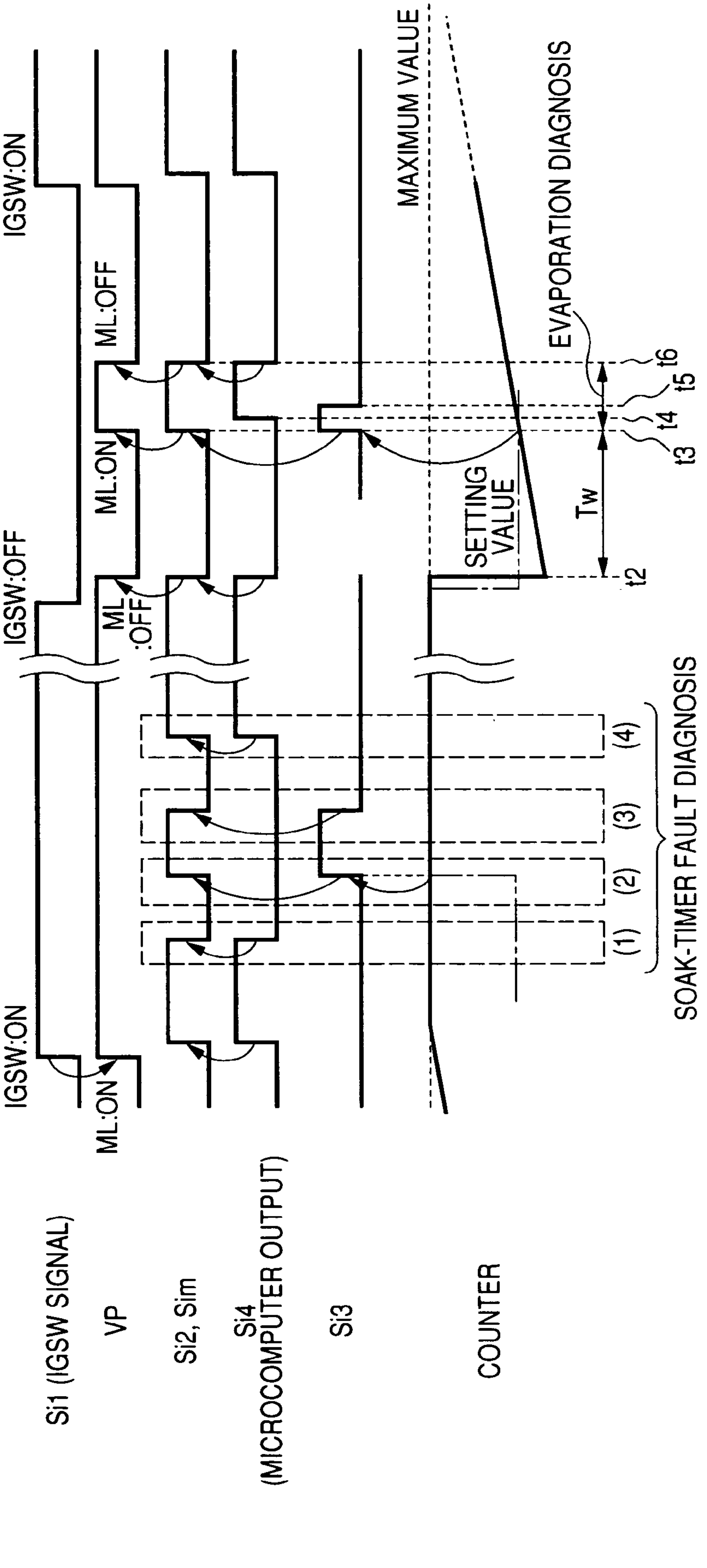
FIG. 9 is a timing chart schematically illustrating timings of operations of the first soak-timer diagnostic task illustrated in FIG. 7.

In step S260, the microcomputer 3 reads out the current count value of the counter 21, and writes a value equivalent to the readout count value into the register 25 as the setting value (see the timing (2) in FIG. 9). This allows the activate signal Si2 from the timer IC 5 to be turned from the low level to the high level. Note that, as an example illustrated in FIG. 9, because the count value of the counter 21 reaches the predetermined maximum value, the maximum value of the counter 21 is written into the register 25.

When performing the steps downstream of the step S230 in FIG. 7 after checking that the count value of the counter 21 reaches the maximum value, the microcomputer 3 can directly write the maximum value of the counter 21 into the register 25 without reading out the current count value.

In step S270, the microcomputer 3 determines whether the monitor signal Sim is turned from the low level to the high level. If it is determined that the monitor signal Sim is turned from the low level to the high level (the determination in step S270 is YES), the microcomputer 3 determines the timer IC 5 normally operates (see the timing (2) in FIG. 9), going to step S280.

In step S280, the microcomputer 3 sends the "output rest command" to the timer IC 5, thereby resetting the comparison result signal Si3 from the high level to the low level in step S280. This allows the activate signal Si2 from the timer IC 5 to be turned from the high level to the low level (the timing (3) in FIG. 9).

In the next step S290, the microcomputer 3 determines whether the monitor signal Sim is turned from the high level to the low level. If it is determined that the monitor signal Sim is turned from the high level to the low level (the determination in step S290 is YES), the microcomputer 3 determines the timer IC 3 normally operates (see the timing (3) in FIG. 9), going to step S300.

In step S300, the microcomputer 3 returns the power hold signal Si4 from the low level to the high level, thereby changing the activate signal Si2 from the timer IC 5 from the low level to the high level (see the timing (4) in FIG. 9).

In step S310, the microcomputer 3 determines whether the monitor signal Sim is changed from the low level to the high level. If it is determined that the monitor signal Sim is changed from the low level to the high level (see the timing (4) in FIG. 9), the microcomputer 3 determines that the timer IC 5 properly operates, exiting the first soak-timer diagnostic task (the determination in step S310 is YES).

In contrast, in step S250, if it is determined that the monitor signal Sim is kept to the high level (the determination in step S250 is NO), the microcomputer 3 determines that a failure or malfunction occurs in the timer IC 5, going to step S320. Similarly, in step S270, if it is determined that the monitor signal Sim is kept to the low level (the determination in step S270 is NO), the microcomputer 3 determines that a failure or malfunction occurs in the timer IC 5, going to step S320.

In addition, in step S290, if it is determined that the monitor signal Sim is kept to the high level (the determination in step S290 is NO), the microcomputer 3 determines that a failure or malfunction occurs in the timer IC 5, going to step S320. Similarly, in step S310, if it is determined that the monitor signal Sim is kept to the low level (the determination in step S310 is NO), the microcomputer 3 determines that a failure or malfunction occurs in the timer IC 5, going to step S320.

In step S320, the microcomputer 3 stores, in the nonvolatile memory, fault information indicative of the occurrence of a failure. The fault information also is indicative of which steps to determine that a failure or malfunction occurs. In step S320, the microcomputer 3 also sends (gives) fault-occurrence notice to the vehicle driver. For example, as the fault-occurrence notice operation, the microcomputer 3 can control at least one alarm lamp attached to a control panel of the vehicle to turn on or flash, and/or beep.

In the next step S330, the microcomputer 3 determines whether the monitor signal Sim is in the low level, and if the monitor signal Sun is in the low level (the determination in step S330 is YES), the microcomputer 3 exits the first soak-timer diagnostic task.

Otherwise if it is determined that the monitor signal Sim is in the high level (the determination in step S330 is NO), the microcomputer 3 goes to step S340. In step S340, the microcomputer 3 turns the power hold signal Si4 from the high level to the low level, outputs the "output reset signal" to the timer IC 5 to reset the comparison result signal Si3 to be turned to the low level, and returns to step S330. Specifically, the microcomputer 3 repeatedly performs the operations in step S340 to turn both the power hold signal Si4 and the comparison result signal Si3 to their low levels, respectively.

Next, as illustrated in FIG. 8, when starting the second soak-timer diagnostic task in parallel with the first soak-timer diagnostic task, the microcomputer 3 determines whether the ignition switch 11 is turned off based on the IGSW signal Si1 in step S410.

If it is determined that the ignition switch 11 is turned off, in other words, the IGSW signal Si1 is turned from the high level to the low level, the microcomputer 3 shifts to step S420. In step S420, the microcomputer 3 executes operations to stop the first soak-timer diagnostic task. Subsequently, in step S430, the microcomputer 3 causes the current state (current level) of each of the power hold signal Si4 and the comparison result signal Si3 to revert to the state before execution of the steps downstream of the step S240 in FIG. 7; these steps, for example, correspond to fault diagnostic operations in the first embodiment.

Specifically, the microcomputer 3 executes to set the power hold signal to the timer IC 5 to the high level, and to output the "output reset command" to the timer IC 5, thereby setting the comparison result signal Si3 to the low level, exiting the second soak-timer diagnostic task.

Note that a delay period Td represents a period between the timing when both the IGSW signal Si1 and the activate signal Si2 are turned to their low levels and that when the main relay 13 is turned off so that the main power-supply circuit 7*m* interrupts the output of the main power supply voltage Vm. In the first embodiment, the period between the timing when the ignition switch 11 is turned off in step S410 and that when the operations in step S430 are completed is sufficiently shorter than the delay period Td.

Specifically, while the activate signal Si2 from the timer IC 5 is in tentatively the low level based on the operations in step S240 or step S280, even if the ignition switch 11 is turned off, the operations in step S430 allow the activate signal Si2 from the timer IC 5 to revert to the high level more quickly than the main relay 13 is tuned off. This allows the microcomputer 3 to continuously operate.

In the ECU 1 with the configuration set forth above, during the IGSW signal Si1 with the high level in response to the turning on of the ignition switch 11, the microcomputer 3 is configured to execute the fault diagnostic operations (steps S240 to S310) by:

changing the output level of the activate signal Si2 to the timer IC to both the high level and the low level; and determining whether the level on the monitor signal line 33 (the level of the monitor signal Sim) is changed depending on the change of the output level of the activate signal Si2, thereby diagnosing whether the timer IC 5 normally operates based on the determined result.

The configuration of the ECU 1 makes it possible to preliminary detect that faults included in the first fault type occur. An example of faults included in the first fault type is such that the activate signal Si2 is not returned from the low level to the high level so that it is difficult to activate the microcomputer 3 during off state of the ignition switch 11 (see FIGS. 5 and 6). The configuration of the ECU 1 therefore allows notification of the occurrence of the fault of the first fault type to the driver.

In addition, the configuration of the ECU 1 makes it possible to preliminarily detect that faults included in the second fault type occur. An example of faults included in the second fault type is such that the activate signal Si2 is not returned from the high level to the low level so that it is difficult to activate the microcomputer 3 during on state of the ignition switch 11 (see FIG. 4). The configuration of the ECU 1 therefore allows notification of the occurrence of the fault of the second fault type to the driver.

For example, such failures included in the second fault types are probably attributed to the activate signal Si2 with the level unchanged from the high level in response to change in level of the power hold signal Si4 from the high level to the low level. The unchanged level of the activate signal Si2 is due to a short circuit in the wiring between the timer IC 5 and the driver 15 on a voltage line on a high level and/or a malfunction in the OR logic gate 29.

In the ECU 1, therefore, if such a failure of the second fault types occurs, the operations of the microcomputer 3 in step S250 allow for detection of the failure by determining that the level on the monitor signal line 33 is not turned to the low level (see the negative determination in step S250).

Moreover, such failures included in the first fault types are probably attributed to the activate signal Si2 with the level unchanged from the low level in response to change in level of the comparison result signal Si3 from the low level to the high level. The unchanged level of the activate signal Si2 is due to a short circuit in the wiring between the timer IC 5 and the driver 15 on a voltage line on a high level and/or a malfunction in the OR logic gate 29.

In addition, such faults included in the first fault types are probably attributed to the comparison result signal Si3 itself with the level unchanged from the low level due to a malfunction or failure of at least one of the counter 21, the register 25, and the comparator 27.

In the ECU 1, therefore, if such a failure of the first fault types occurs, the operations of the microcomputer 3 in step S270 allow for detection of the failure by determining that the level on the monitor signal line 33 is not turned to the high level (see the negative determination in step S270).

Furthermore, such failures included in the second fault types are probably attributed to the activate signal Si2 with the level unchanged from the high level in response to the comparison result signal Si3 with the level unchanged from the high level to the low level.

In addition, such faults included in the second fault types are probably attributed to the comparison result signal Si3 itself with the level unchanged from the high level due to a malfunction or failure of the comparator 27.

In the ECU 1, therefore, if such a failure of the second fault types occurs, the operations of the microcomputer 3 in step S290 allow for detection of the failure by determining that the level on the monitor signal line 33 is not turned to the low level (see the negative determination in step S290)

On the other hand, if a failure in which the activate signal Si2 is not turned from the low level to the high level in response to change in the level of the power hold signal Si4 from the low level to the high level occurs, the power hold signal S4 prevents power supply to the microcomputer 3 from being interrupted. Due to the power-supply interruption to the microcomputer 3, it is difficult to carry out operations during engine stop; these operations are required to be executed after turning-off of the ignition switch 11. Similarly, due to the power-supply interruption to the microcomputer 3, it is also difficult to carry out steps downstream of step S140 in FIG. 2.

In the ECU 1, if such a failure of the second fault types occurs, the operations of the microcomputer 3 in step S310 allow for detection of the failure by determining that the level on the monitor signal line 33 is not turned to the high level (see the negative determination in step S310). The configuration of the ECU 1 therefore allows notification of the occurrence of the fault of the second fault type to the driver.

As described above, in the ECU 1 according to the first embodiment, the operations in steps S240 to S310 permit fault diagnostic operations for the functions of the timer IC 5 to be efficiently performed without omission.

Figure 10:
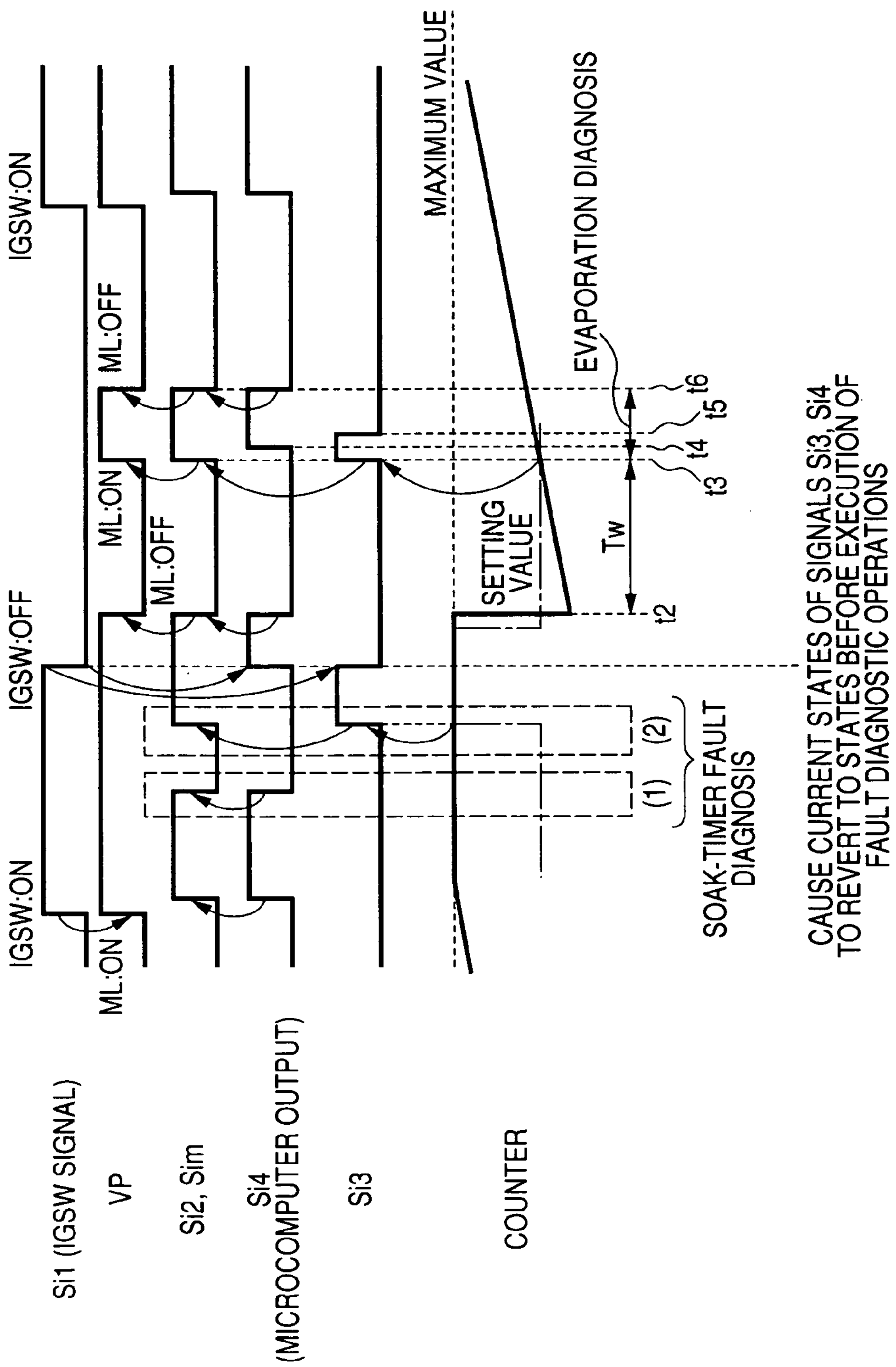
FIG. 10 is a timing chart schematically illustrating timings of operations of the second soak-timer diagnostic task illustrated in FIG. 8.

In addition, in the ECU 1 according to the first embodiment, the microcomputer 3 is configured to execute the operations illustrated in FIG. 8 in parallel with the operations illustrated in FIG. 7. Specifically, as illustrated in FIG. 10, when it is detected that the IGSW signal Si1 is turned from the high level to the low level (see the affirmative determination in step S410), the current level of each of the power hold signal Si4 and the comparison result signal Si3 is configured to revert to the state before execution of the steps downstream of the step S240 in FIG. 7 (see step S430). Note that FIG. 10 represents that the ignition switch 11 is turned off before the step S280 is executed after execution of the step S260.

This allows the microcomputer 3 to smoothly start to execute operations that should be executed after turning-off of the ignition switch 11 even though performing the operations illustrated in FIG. 7. In other words, this permits the microcomputer 3 to smoothly shift from the fault diagnostic operations to the normal operations.

Moreover, in the ECU 1 according to the first embodiment, if executing the negative determination in any one of the steps S250, S270, S290, and S310, the microcomputer 3 interrupts the fault diagnostic operations (S240 to S310) at the negative determination timing, shifting to step S320. In step S320, after giving the fault-occurrence notice to the vehicle driver, the microcomputer 3 repeatedly executes the operations in step S340 to turn both the power hold signal Si4 and the comparison result signal Si3 to their low levels, respectively, until it is determined that the level on the monitor signal line 33 is turned to the low level in step S330.

When occurrence of a fault is detected, it is possible to immediately inform that to the driver, and to prevent the main relay 13 from remaining in on state.

Furthermore, in the ECU 1 according to the first embodiment, the microcomputer 3 is configured to execute the fault diagnostic operations in steps S240 to S310 when determining that the vehicle speed is equal to or higher than the predetermined threshold value (see the affirmative determination in step S210).

During execution of the fault diagnostic operations, when the microcomputer 3 forcibly turns the activate signal Si2 to the low level, it is possible to securely prevent the main relay 13 from being turned off. This is because the ignition switch 11 is free from the possibility of being turned off during vehicle running.

Second Embodiment

An ECU according to a second embodiment of the present invention will be described hereinafter. Note that the hardware structure of the ECU according to the second embodiment will be substantially identical with that of the ECU 1 according to the first embodiment, and therefore, like reference characters of the ECU 1 in FIG. 1 are assigned to like parts of the ECU according to the second embodiment so that descriptions of the parts will be omitted.

Figure 11:
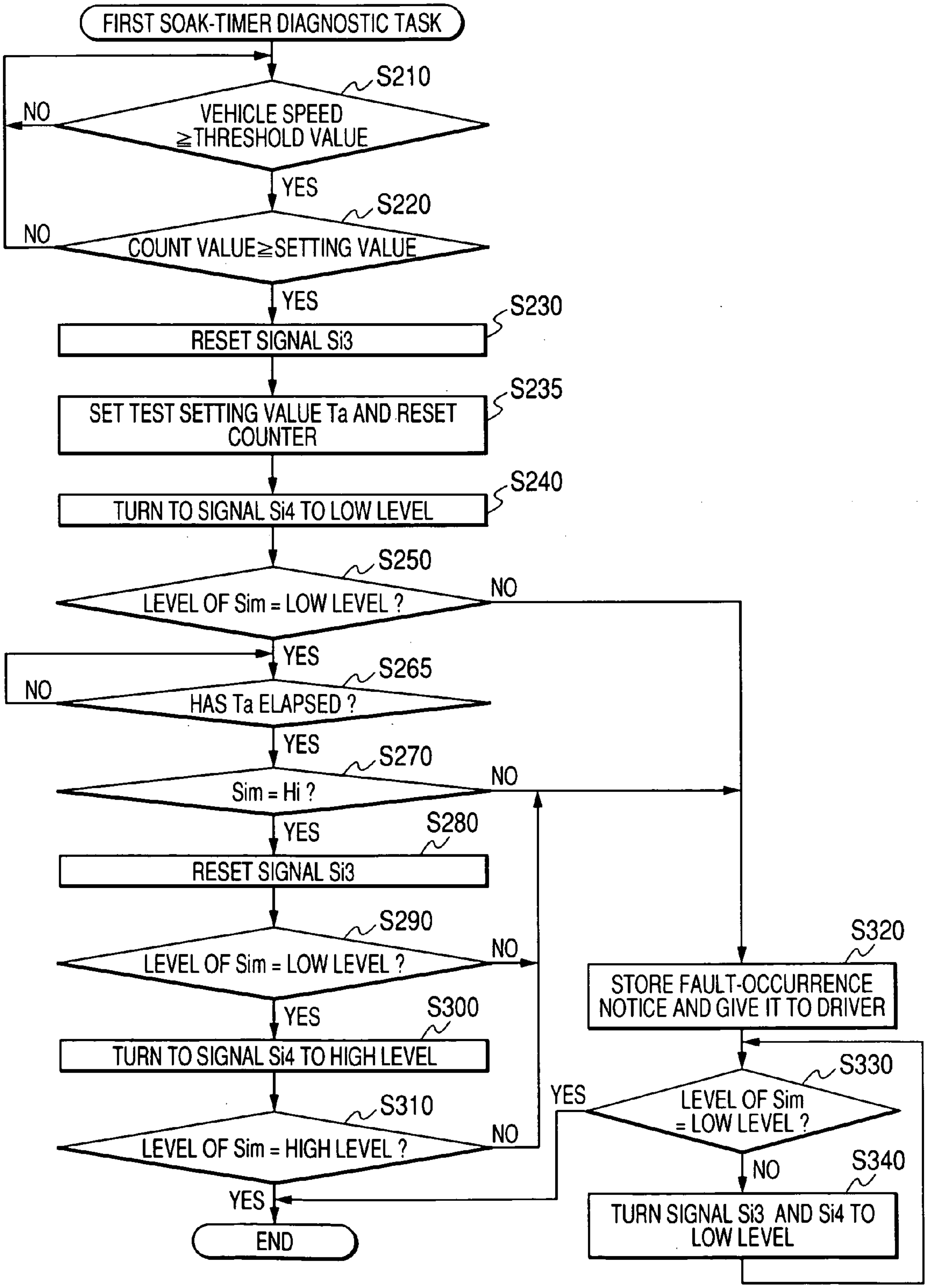
FIG. 11 is a flowchart schematically illustrating a first soak-timer diagnostic task of an electronic control unit according to a second embodiment of the present invention.

As compared with the ECU 1, the ECU of the second embodiment has a different point from the ECU 1 in that the microcomputer 3 executes the operations illustrated in FIG. 11 in place of the operations illustrated in FIG. 7.

In the operations illustrated in FIG. 11, as compared with those illustrated in FIG. 7, operations in step S235 are added between the operations in step S230 and those in step S240, and operations in step S265 are executable in place of those in step S260. Note that identical step numbers used in FIG. 7 are assigned to identical steps in FIG. 11 so that descriptions of the steps will be omitted.

Specifically, as illustrated in FIG. 11, in the ECU according to the second embodiment, after sending the "output reset command" to the timer IC 5 in step S230, the microcomputer 3 goes to step S235.

In step S235, the microcomputer 3 writes a test setting value into the register 25 of the timer IC 5; this test setting value is considerably less than the setting value to be normally written into the register 25 in step S140. In step S235, the microcomputer 3 also sends the "timer-start command" to the timer IC 5 to cause the counter 21 to count up from its initial value (zero), and thereafter, carries out the operations in steps S240 and S250.

If it is determined that the level of the monitor signal Sim input through the monitor signal line 33 is turned from the high level to the low level (the determination in step S250 is YES), the microcomputer 3 determines that the timer IC 5 properly operates, going to step S265.

In step S265, the microcomputer 3 waits until a test period Ta corresponding to the test setting value has elapsed since execution of the operations in step S235. If it is determined that the test period Ta has elapsed (the determination in step S265 is YES), the microcomputer 3 goes to step S270, and determines whether the monitor signal Sim is turned from the low level to the high level.

Specifically, in the first embodiment, as manipulations to turn the comparison result signal Si3 from the low level to the high level, the microcomputer 3 writes the value equivalent to the readout count value of the counter 21 into the register 25 as the setting value (see step S260 in FIG. 7).

Figure 12:
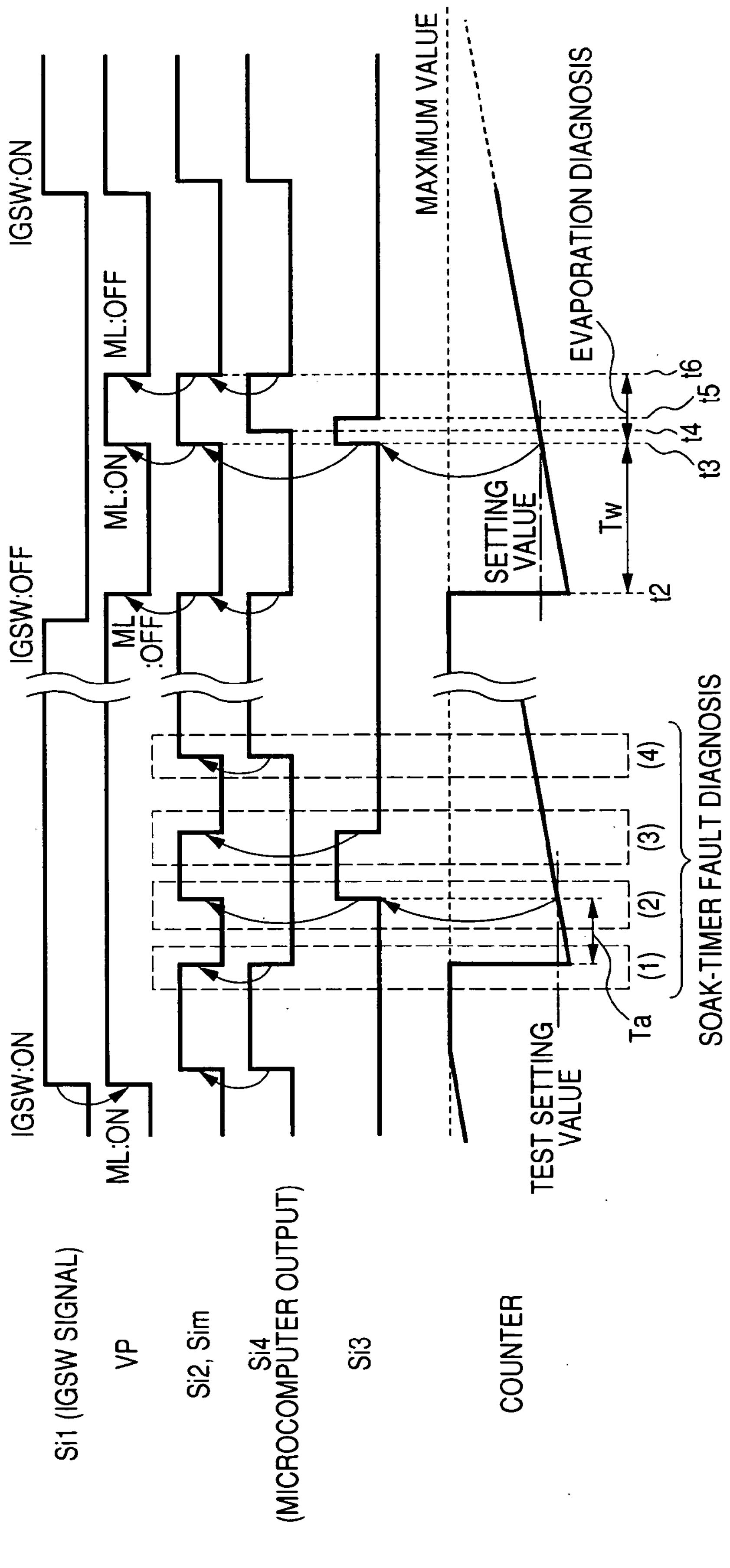
FIG. 12 is a timing chart schematically illustrating timings of operations of the first soak-timer diagnostic task illustrated in FIG. 11.

In contrast, in the second embodiment, as illustrated by the timings (1) and (2) in FIG. 12, the microcomputer 3 sets the test setting value to the register 25, and causes the counter 21 to restart to count up from its initial value (zero) (see step S235). This allows the comparison result signal Si3 to be changed from the low level to the high level when the test period corresponding to the test setting value Ta has elapsed.

When detecting that the comparison result signal Si3 to be changed from the low level to the high level, the microcomputer 3 determines whether the level of the monitor signal line 33 is turned from the low level to the high level (see the affirmative determination in step S265 and step S270).

The configuration of the ECU according to the second embodiment can obtain the same effects as obtained by the first embodiment.

In the ECU according to the second embodiment, the microcomputer 3 executes, in step S235 of FIG. 11, the operations identical with those in steps S140 and S150 of FIG. 2. This allows a program module corresponding to the operations in step S235 (steps S140 and S150) to be shared, making it possible to simplify the whole of the programs.

In contrast, as described in the first embodiment, when a value equivalent to the count value of the counter 21 is written into the register 25 as the setting value to cause the comparison result signal Si3 to be turned to the high level, it is possible to immediately turn the comparison result signal Si3 from the low level to the high level. This has an advantage in repeatedly executing the first soak-timer diagnostic task at a predetermined number of times.

Figure 13:
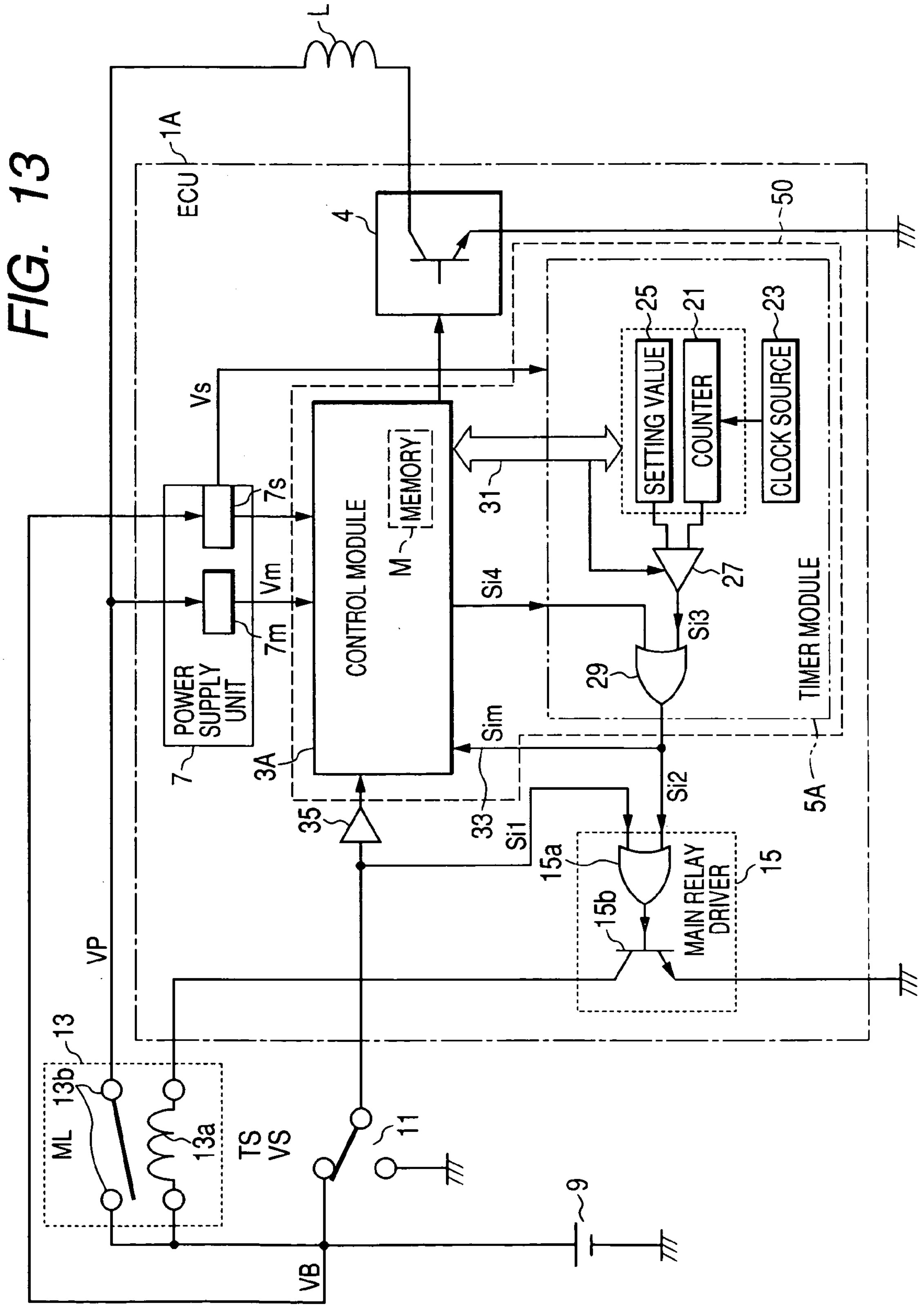
FIG. 13 is a circuit diagram schematically illustrating an example of the configuration of an electronic control unit according to a first modification of the first embodiment of the present invention.
Figure 14:
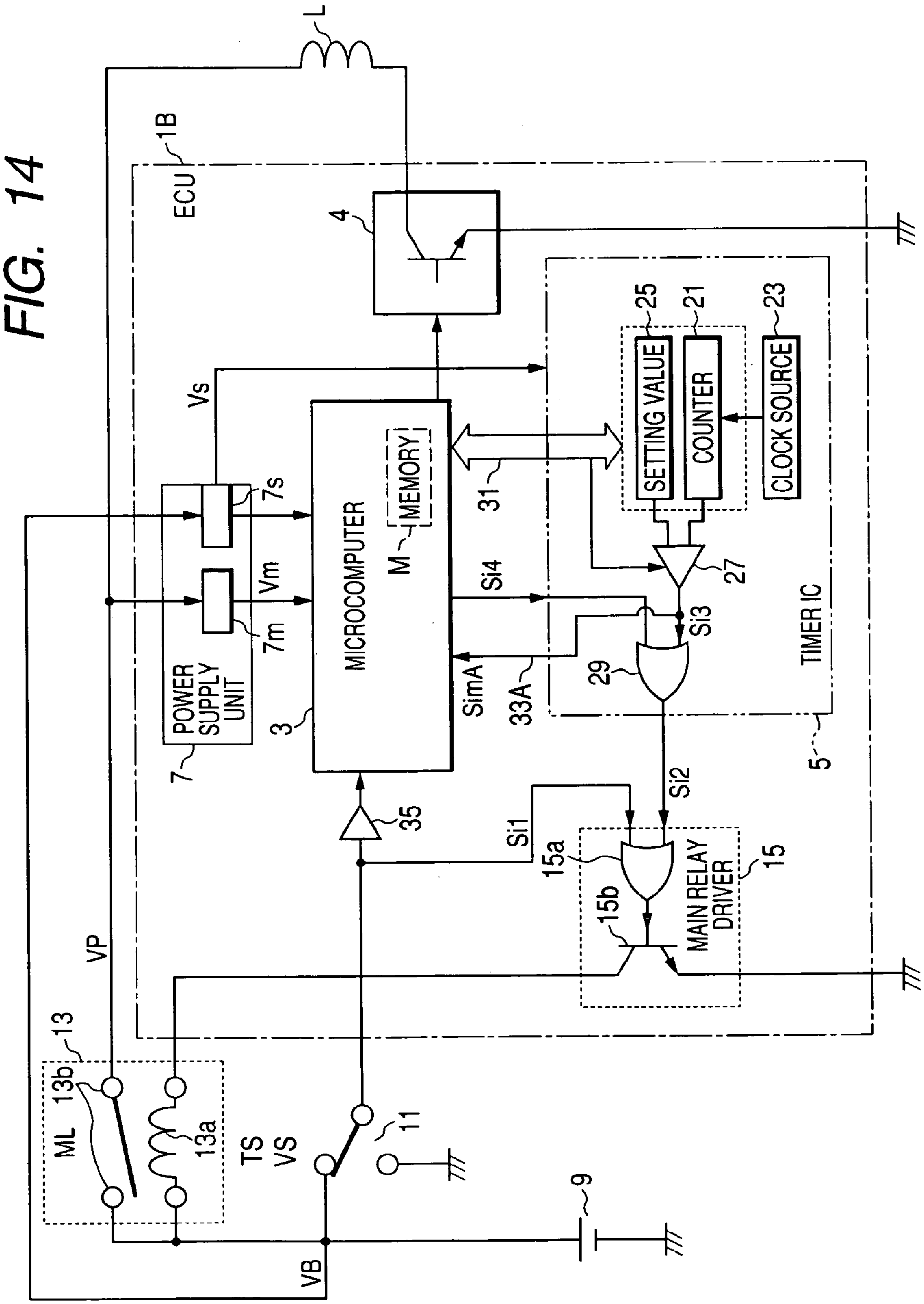
FIG. 14 is a circuit diagram schematically illustrating an example of the configuration of an electronic control unit according to a second modification of the first embodiment of the present invention.

An example of the configuration of an ECU 1A according to a first modification of each of the first and second embodiments is illustrated in FIG. 13.

As illustrated in FIG. 13, the ECU 1A includes an IC 50 operatively composed of a control module 3A and a timer module 5A. In other words, the control module 3A and the timer module 5A constitute a microcomputer.

Specifically, the control module 3A is operatively linked to the timer module 5A, and functionally equivalent to the microcomputer 3. The timer module 5A is composed of functional modules 21, 23, 25, 27, and 29, which are functionally equivalent to the elements 21, 23, 25, 27, and 29 according to the first embodiment. These operations of the ECU 1A (control module 3A and the timer module 5A) are substantially identical with those of the ECU 1 in each of the first and second embodiments, and therefore, descriptions of which are omitted.

Moreover, in each of the first and second embodiments and the first modification, the microcomputer (control module) is electrically or operatively linked to the output terminal of the OR gate 29 so as to monitor the monitor signal Sim equivalent to the activate signal Si2, but the present invention is not limited to the structure.

Specifically, as a second modification, an ECU 1B is equipped with a monitor signal line 33A electrically or operatively connected between the output of the comparator 27 and the microcomputer 3 in place of the monitor signal line 33. The monitor signal line 33A allows the microcomputer 3 to monitor the comparison result signal Si3 output from the comparator 27. Specifically, the microcomputer 3 is configured to receive a monitor signal SimA equivalent to the comparison result signal Si3 and input from the comparator 27 through the monitor signal line 33A and to monitor the level of the comparison result signal Si3 being output from the comparator 27 to the OR gate 29.

Specifically, as illustrated in FIG. 3, change in level of the activate signal Si2 depends on change in level of the power hold signal S4 to be output from the microcomputer 3 and that in level of the comparison result signal Si3. The microcomputer 3 therefore makes it possible to grasp change in level of the activate signal Si2 by monitoring the comparison result signal Si3. The second modification can be applied to the structure of the first modification illustrated in FIG. 13.

Moreover, in each of the first and second embodiments and its modifications, the IGSW signal is used as the activate switch signal, but the present invention is not limited to the structure.

Specifically, in addition to the IGSW signal, as the activate switch signal, at least one of the following switch signals can be used:

a key switch signal representing the timing when a key switch is turned on in response to insertion of the ignition key into the key cylinder by the driver;

a fuel filler lid opener signal representing the timing when a fuel filler lid opener switch for opening a fuel filler opening of a fuel tank of the vehicle is turned on by the driver;

an accessory switch signal representing the timing when an accessory switch of the vehicle for allowing an occupant of the vehicle to operate accessories installed in the vehicle without engaging the engine is turned on by, for example, locating the ignition key being inserted in the key cylinder to the accessory position by the driver;

a starter switch signal representing the timing when a starter switch, such as a solenoid starter switch, of the vehicle for cranking the engine is turned on by, for example, locating the ignition key being inserted in the key cylinder to the starter position by the driver; and a shift (selector lever) lock release switch signal representing the timing when a shift lock release switch for releasing the shift lock (gear shift lever lock) is turned on by the driver.

Still furthermore, in each of the first and second embodiments and their modifications, the ECU is installed in a vehicle, but a control unit functionally equivalent to the ECU can be installed in other types of machines. Moreover, in each of the first and second embodiments and their modifications, the ECU can control, as a target, other components installed in a vehicle, such as a brake, a transmission, and suspensions.

In each of the first and second embodiments and their modifications, the elements provided in the microcomputer can be implemented as dedicated hardware devices, such as custom LSI (Large-Scale Integration) circuits.

In addition, those skilled in the art will appreciate that the present invention is capable of being distributed as program products, for example, the programs stored in the memory unit M in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. An electronic control unit comprising:

a power supply circuit configured to receive an externally input first activate signal and a second activate signal and configured to output a first power supply voltage when it is determined that at least one of the first and second activate signals is in an active level, the power supply circuit being configured to interrupt the output of the first power supply voltage when it is determined that both the first and second activate signals are inactive levels, respectively;

a timer circuit configured to:

measure a period that has elapsed since the interruption of the output of the power supply voltage, turn the second activate signal from the inactive level to the active level when the measured period reaches a predetermined first setting period, the level of the second activate signal being changeable between the inactive level and the active level based on external control, and output a monitor signal associated with the second activate signal; and a computer operable based on the first power supply voltage output from the power supply circuit, the computer being configured to execute a fault diagnostic task by:

controlling the timer circuit to change the level of the second activate signal between the inactive level and the active level during the active level of the first activate signal, and monitoring a level of the monitor signal output from the timer circuit to determine whether the level of the second activate signal is turned depending on the change of the second activate signal by the timer circuit based on the monitored level of the monitor signal.

2. An electronic control unit according to claim 1, wherein the monitor signal is equivalent to the second activate signal output from the timer circuit.

3. An electronic control unit according to claim 1, wherein the timer circuit is operable based on a second power supply voltage continuously being supplied thereto, the timer circuit comprises:

a counter configured to count so as to measure the period;

a storing device configured to store a first setting value corresponding to the first setting period; and an electronic circuit configured to:

set a first control signal to an active level when a count value of the counter reaches the first setting value and to an inactive level when a reset command is input to the timer circuit, and OR the first control signal and a second control signal, thereby outputting the ORed result as the second activate signal, and wherein the computer is configured to:

write the first setting value into the storing device, send the reset command to the timer circuit, send the second control signal to the timer circuit, and execute, as the fault diagnostic task, the following first to fourth processes in this order:

the first process to turn the second control signal from the active level to the inactive level to check whether the level of the monitor signal is changed from the active level to the inactive level depending on the turning of the level of the second control signal;

the second process to turn the first control signal from the inactive level to the active level to check whether the level of the monitor signal is changed from the inactive level to the active level depending on the turning of the level of the first control signal;

the third process to turn the first control signal from the active level to the inactive level to check whether the level of the monitor signal is changed from the active level to the inactive level depending on the turning of the level of the first control signal; and the fourth process to turn the second control signal from the inactive level to the active level to check whether the level of the monitor signal is changed from the inactive level to the active level depending on the turning of the level of the second control signal.

4. An electronic control unit according to claim 3, wherein the second process includes a process to write the count value of the counter into the storing device, thereby turning the first control signal from the inactive level to the active level.

5. An electronic control unit according to claim 3, wherein the second process includes a process to write, into the storing device, a second setting value different from the first setting value, and to restart the counter, thereby turning the first control signal from the inactive level to the active level.

6. An electronic control unit according to claim 3, wherein, when the first activate signal is turned from the active level to the inactive level during execution of the fault diagnostic task, the computer is configured to cause each of the levels of the first and second control signals to revert to a level before execution of the fault diagnostic task within a delay period, the delay period representing a period between a timing when each of the first and second activate signals is turned to the corresponding inactive level and that representing interruption of the output of the power supply voltage to the computer by the power supply circuit.

7. An electronic control unit according to claim 3, wherein, when determining that the level of the monitor signal is not changed at any one of the first to fourth processes, the computer is configured to:

interrupt the fault diagnostic task at the determining timing, send out a notice indicative of occurrence of fault, and repeatedly turn both the first and second control signals to the corresponding inactive levels until it is determined that the second activate signal is turned to the inactive level.

8. An electronic control unit according to claim 1, wherein the electronic control unit is installed in a vehicle, the first activate signal is an ignition switch signal that is turned to the active level when an ignition switch installed in the vehicle is turned on, and the computer is configured to determine whether the vehicle speed is equal to or higher than a predetermined threshold speed, and to execute the fault diagnostic task when it is determined that the vehicle speed is equal to or higher than the predetermined threshold speed.

9. An electronic control unit according to claim 1, wherein the timer circuit is operable based on a second power supply voltage continuously being supplied thereto, the timer circuit comprises:

a counter configured to count so as to measure the period;

a storing device configured to store a first setting value corresponding to the first setting period; and a comparator configured to:

set a first control signal to an active level when a count value of the counter reaches the first setting value and to an inactive level when a reset command is input to the timer circuit, and OR the first control signal and a second control signal, thereby outputting the ORed result as the second activate signal, the computer is configured to:

write the predetermined setting value into the storing device, send the reset command to the timer circuit, and send the second control signal to the timer circuit, and wherein the monitor signal is equivalent to the first control signal.

10. An electronic control unit comprising:

a power supply circuit configured to receive an externally input first activate signal and a second activate signal and configured to output a first power supply voltage when it is determined that at least one of the first and second activate signals is in an active level, the power supply circuit being configured to interrupt the output of the first power supply voltage when it is determined that both the first and second activate signals are inactive levels, respectively; and an IC circuit including a timer module and a control module, the timer module being configured to:

measure a period that has elapsed since the interruption of the output of the power supply voltage, turn the second activate signal from the inactive level to the active level when the measured period reaches a predetermined first setting period, the level of the second activate signal being changeable between the inactive level and the active level based on external control, and output a monitor signal associated with the second activate signal, the control module being operable based on the first power supply voltage output from the power supply circuit, the control module being configured to execute a fault diagnostic task by:

controlling the timer module to change the level of the second activate signal between the inactive level and the active level during the active level of the first activate signal, and monitoring a level of the monitor signal output from the timer circuit to determine whether the level of the second activate signal is turned depending on the change of the second activate signal by the timer module based on the monitored level of the monitor signal.

11. An electronic control unit according to claim 10, wherein the monitor signal is equivalent to the second activate signal output from the timer module.

12. An electronic control unit according to claim 10, wherein the timer module is operable based on a second power supply voltage continuously being supplied thereto, the timer module comprises:

a counter configured to count so as to measure the period;

a storing device configured to store a first setting value corresponding to the first setting period; and an electronic circuit configured to:

set a first control signal to an active level when a count value of the counter reaches the first setting value and to an inactive level when a reset command is input to the timer module, and OR the first control signal and a second control signal, thereby outputting the ORed result as the second activate signal, and wherein the control module is configured to:

write the first setting value into the storing device, send the reset command to the timer module, send the second control signal to the timer module, and execute, as the fault diagnostic task, the following first to fourth processes in this order:

the first process to turn the second control signal from the active level to the inactive level to check whether the level of the monitor signal is changed from the active level to the inactive level depending on the turning of the level of the second control signal;

the second process to turn the first control signal from the inactive level to the active level to check whether the level of the monitor signal is changed from the inactive level to the active level depending on the turning of the level of the first control signal;

the third process to turn the first control signal from the active level to the inactive level to check whether the level of the monitor signal is changed from the active level to the inactive level depending on the turning of the level of the first control signal; and the fourth process to turn the second control signal from the inactive level to the active level to check whether the level of the monitor signal is changed from the inactive level to the active level depending on the turning of the level of the second control signal.

13. An electronic control unit according to claim 12, wherein the second process includes a process to write the count value of the counter into the storing device, thereby turning the first control signal from the inactive level to the active level.

14. An electronic control unit according to claim 12, wherein the second process includes a process to write, into the storing device, a second setting value different from the fist setting value, and to restart the counter, thereby turning the first control signal from the inactive level to the active level.

15. An electronic control unit according to claim 12, wherein, when the first activate signal is turned from the active level to the inactive level during execution of the fault diagnostic task, the control module is configured to cause each of the levels of the first and second control signals to revert to a level before execution of the fault diagnostic task within a delay period, the delay period representing a period between a timing when each of the first and second activate signals is turned to the corresponding inactive level and that representing interruption of the output of the power supply voltage to the control module by the power supply circuit.

16. An electronic control unit according to claim 12, wherein, when determining that the level of the monitor signal is not changed at any one of the first to fourth processes, the control module is configured to:

interrupt the fault diagnostic task at the determining timing, send out a notice indicative of occurrence of fault, and repeatedly turn both the first and second control signals to the corresponding inactive levels until it is determined that the second activate signal is turned to the inactive level.

17. An electronic control unit according to claim 10, wherein the electronic control unit is installed in a vehicle, the first activate signal is an ignition switch signal that is turned to the active level when an ignition switch installed in the vehicle is turned on, and the control module is configured to determine whether the vehicle speed is equal to or higher than a predetermined threshold speed, and to execute the fault diagnostic task when it is determined that the vehicle speed is equal to or higher than the predetermined threshold speed.

18. An electronic control unit according to claim 10, wherein the timer module is operable based on a second power supply voltage continuously being supplied thereto, the timer module comprises:

a counter configured to count so as to measure the period;

a storing device configured to store a first setting value corresponding to the first setting period; and an electronic circuit configured to:

set a first control signal to an active level when a count value of the counter reaches the first setting value and to an inactive level when a reset command is input to the timer circuit, and OR the first control signal and a second control signal, thereby outputting the ORed result as the second activate signal, the control module is configured to:

write the predetermined setting value into the storing device, send the reset command to the timer module, and send the second control signal to the timer module, and wherein the monitor signal is equivalent to the first control signal.

* * * * *